US008688683B2

(12) United States Patent
Simon et al.

(10) Patent No.: US 8,688,683 B2
(45) Date of Patent: Apr. 1, 2014

(54) QUERY PLAN REFORMULATION

(75) Inventors: Eric Simon, Juvisy (FR); Francois Llirbat, Bagnolet (FR); Francoise Fabret, Versailles (FR); Nicolas Dieu, Boulogne Billancourt (FR); Adrian Dragusanu, Poissy (FR)

(73) Assignee: Business Objects Software Ltd., Dublin (IE)

( * ) Notice: Subject to any disclaimer, the term of this patent is extended or adjusted under 35 U.S.C. 154(b) by 874 days.

(21) Appl. No.: 12/628,098

(22) Filed: Nov. 30, 2009

(65) Prior Publication Data

US 2011/0131199 A1    Jun. 2, 2011

(51) Int. Cl.
    G06F 17/30    (2006.01)
    G06F 7/00    (2006.01)
(52) U.S. Cl.
    USPC .......................................... 707/713; 707/756
(58) Field of Classification Search
    USPC .................................................. 707/713, 758
    See application file for complete search history.

(56) References Cited

U.S. PATENT DOCUMENTS

| 6,496,819 | B1 * | 12/2002 | Bello et al. .......................... 1/1 |
| 7,761,480 | B2 * | 7/2010 | Toledano et al. ............. 707/804 |
| 2011/0022583 | A1 * | 1/2011 | Pennell et al. ................ 707/718 |

OTHER PUBLICATIONS

Dieu, Nicolas, et al., "1,000 Tables Under the From", *VLDB Endowment*, (Aug. 9), 12 pgs.

Bernstein, P. A, et al., "Using Semi-Joins to Solve Relational Queries", J. ACM, 28(1), (Jan. 1981), 25-40.
Bhargava, G., et al., "Efficient Processing of Outer Joins and Aggregate Functions", Proceedings of the Twelfth International Conference on Data Engineering, (1996), 441-449.
Chaudhuri, Surajit, "An Overview of Query Optimization in Relational Systems", Proceedings of the seventeenth ACM SIGACT-SIGMOD-SIGART symposium on Principles of database systems, (1998), 34-43.
Chaudhuri, Surajit, "Query Optimizers: Time to Rethink the Contract?", Proceedings of the 35th SIGMOD international conference on Management of data, (2009), 961-968.
Cohen, S., et al., "Full disjunctions: polynomial-delay iterators in action", Proceedings of the 32nd international conference on Very large data bases, (2006), 739-750.
Florescu, Daniela, et al., "Query Optimization in the Presence of Limited Access Patterns", SIGMOD Rec., 28(2), (1999), 311-322.
Galindo-Legaria, Cesar, et al., "Outerjoin simplification and reordering for query optimization", ACM Trans. Database Syst., 22(1), (1997), 43-74.
Graefe, G., "Query Evaluation Techniques for Large Databases", ACM Computing Surveys, 25(2), (1993), 73-170.
Haas, Laura M, et al., "Extensible Query Processing in Starburst", Proceedings of the 1989 ACM SIGMOD international conference on Management of data, (1989), 377-388.

(Continued)

*Primary Examiner* — Kuen Lu
(74) *Attorney, Agent, or Firm* — Schwegman, Lundberg & Woessner, P.A.

(57) ABSTRACT

Apparatus, systems, and methods may operate to receive an original query plan, to transform the original query plan into an equivalent executable compact query plan, and to store the compact query plan on a machine readable device. Further activities may include computing maximal source sub-queries associated with the compact query plan, and computing semi-join reductions of the maximal source sub-queries to provide an executable derivative query plan, which may also be stored on a machine readable device. Additional apparatus, systems, and methods are described.

23 Claims, 12 Drawing Sheets

(56) References Cited

OTHER PUBLICATIONS

Haas, Laura M, et al., "Optimizing Queries across Diverse Data Sources", Proceedings of the 23rd International Conference on Very Large Data Bases, (1997), 276-285.

Halevy, Alon Y, et al., "Enterprise information integration: successes, challenges and controversies", Proceedings of the 2005 ACM SIGMOD international conference on Management of data, (2005), 778-787.

Ioannidis, Y. E, et al., "Randomized algorithms for optimizing large join queries", Proceedings of the 1990 ACM SIGMOD international conference on Management of data, (1990), 312-321.

Kossmann, D., et al., "Iterative dynamic programming: a new class of query optimization algorithms", ACM Trans. Database Syst., 25(1), (2000), 43-82.

Kossmann, D., "The State of the Art in Distributed Query Processing", ACM Computing Surveys, 32(4), (2000), 422-469.

Larson, Per-Ake, et al., "View Matching for Outer-Join Views", The VLDB Journal, 16(1), (2007), 29-53.

Manolescu, Ioana, et al., "Efficient querying of distributed resources in mediator systems", On the Move to Meaningful Internet Systems, 2002—DOA/CoopIS/ODBASE 2002 Confederated International Conferences DOA, CoopIS and ODBASE 2002, (2002), 468-485.

Moerkotte, G., et al., "Analysis of two existing and one new dynamic programming algorithm for the generation of optimal bushy join trees without cross products", Proceedings of the 32nd international conference on Very large data bases, (2006), 930-941.

Moerkotte, G., et al., "Dynamic Programming Strikes Back", Proceedings of the 2008 ACM SIGMOD international conference on Management of data, (2008), 539-552.

Neumann, T., "Query simplification: graceful degradation for join-order optimization", Proceedings of the 35th SIGMOD international conference on Management of data, (2009), 403-414.

Neumann, T., et al., "Scalable Join Processing on Very Large RDF Graphs", Proceedings of the 35th SIGMOD international conference on Management of data, (2009), 627-640.

Ono, K., et al., "Measuring the complexity of join enumeration in query optimization", Proceedings of the sixteenth international conference on Very large databases, (1990), 314-325.

Pirahesh, H., et al., "Extensible/rule based query rewrite optimization in Starburst", Proceedings of the 1992 ACM SIGMOD international conference on Management of data, (1992), 39-48.

Rajaraman, A., et al., "Answering queries using templates with binding patterns (extended abstract)", Proceedings of the fourteenth ACM SIGACT-SIGMOD-SIGART symposium on Principles of database syste, (1995), 105-112.

Rao, J., et al., "Canonical Abstraction for Outerjoin Optimization", Proceedings of the 2004 ACM SIGMOD international conference on Management of data, (2004), 671-682.

Rao, J., et al., "Using EELs, a practical approach to outerjoin and antijoin reordering", 17th International Conference on Data Engineering, 2001. Proceedings., (2001), 585-594.

Selinger, P. G, et al., "Access path selection in a relational database management system", Proceedings of the 1979 ACM SIGMOD international conference on Management of data, (1979), 23-34.

Stocker, K., et al., "Integrating Semi-Join-Reducers into State-of-the-Art Query Processors", 17th International Conference on Data Engineering, 2001. Proceedings., (2001), 575-584.

\* cited by examiner

QUERY PLAN REFORMULATION

LIMITED COPYRIGHT WAIVER

A portion of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data described below and in the drawings and appendices that form a part of this document: Copyright 2009 Business Objects Software Ltd. of Ireland, All Rights Reserved.

BACKGROUND

The goal of operational Business Intelligence (BI) is to help organizations improve the efficiency of their business by giving users information that can be used to make better operational decisions, aligning day-to-day operations with strategic goals. Operational BI reporting contributes to this goal by embedding analytics and reporting information into workflow applications so that the business user has information (e.g., contextual and business data) on which to base a variety of decisions. The creation and querying of customized virtual database schemas over a set of distributed and heterogeneous data sources can provide input to operational BI reports.

Sometimes operational BI reporting applications increase the complexity of source to target mapping defined between source data and virtual databases, resulting in the execution of "mega queries" (e.g., queries with upwards of 1,000 tables in their FROM clause). Mega queries are not supported today by many commercial database systems, including Oracle, DB2, SQL Server and others. Academic research results in the published literature also do not provide solutions for the support of mega queries.

BRIEF DESCRIPTION OF THE DRAWINGS

Some embodiments are illustrated by way of example and not limitation in the figures of the accompanying drawings, in which.

DETAILED DESCRIPTION

Figure 1:
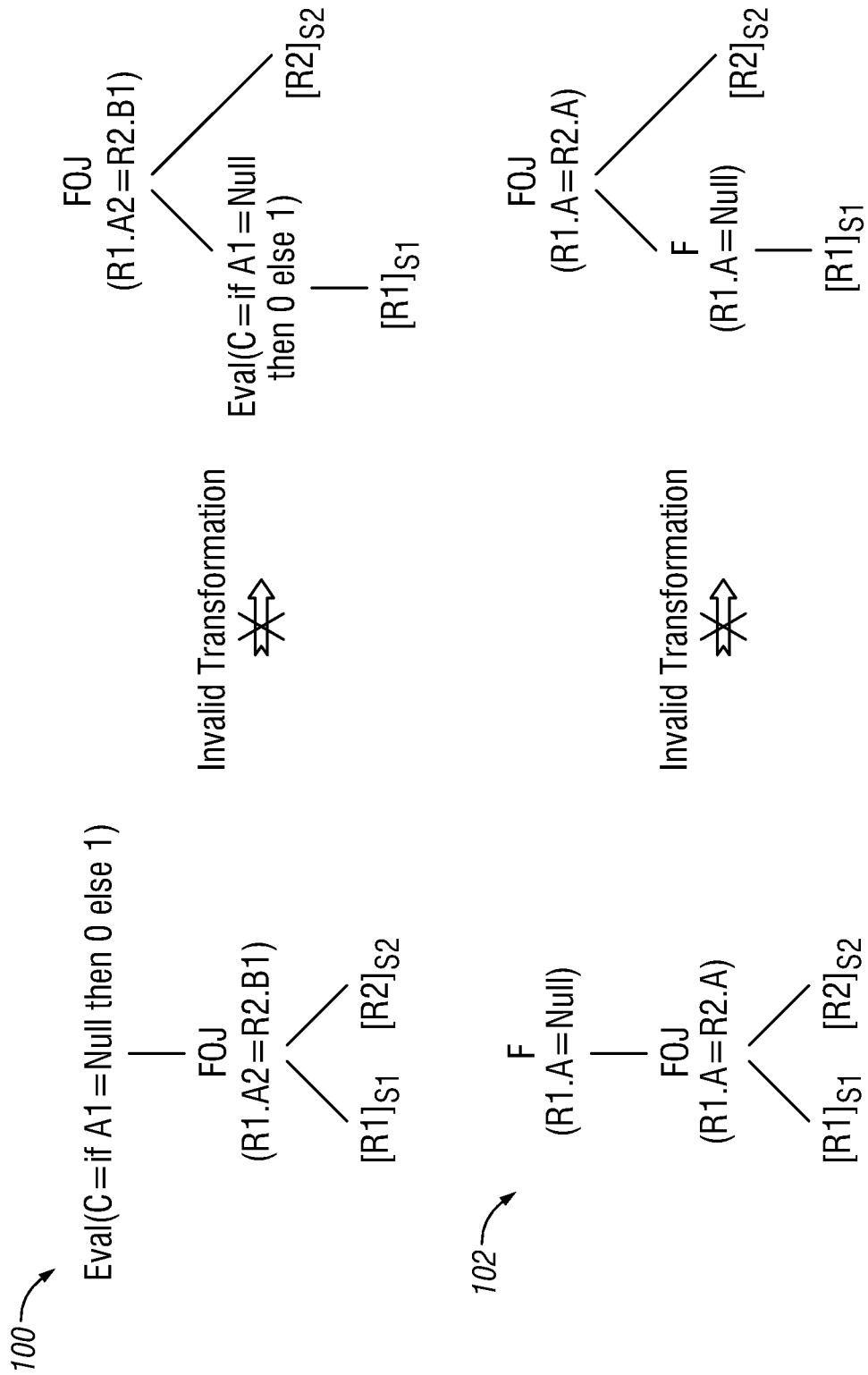
FIG. 1 illustrates query plan case analyses for N and N=F, according to various embodiments of the invention.

One of the challenges raised by mega queries is their optimization in terms of cost in time and space. Thus, it may be useful to find a query execution plan that reduces the cost of the query. The cost can be expressed as a function of disk accesses, CPU, and memory usage, assuming that all the data are resident on disk and can be accessed using sequential scans or specific access methods (such as indices or hash tables). One of the decisions that can affect the cost of a query plan is the ordering of joins (inner-joins and outer-joins). The cost of join ordering is high in O(n!) where n is the number of tables in the query.

Some proposals to optimize queries make use of dynamic programming for re-ordering operations, enumeration architectures based on extensible optimizers, and simplification of the join graph; none of these scale very well for large queries. Another approach includes extended versions of dynamic programming, such as iterative dynamic programming (IDP), which does not scale to hundreds of tables and does not minimize the data processing. Randomized algorithms have also been proposed for large queries, but they do not apply to large classes of SQL queries, and the quality of optimization is hard to predict. Also, they do not attempt to reduce the data processing set of queries. Finally, the introduction of semi-join reducers in a query plan dramatically increases the search space of all possible query plans.

To reduce the complexity of mega-queries, various embodiments of the invention operate to create an equivalent executable compact query plan (CQP) from an original query plan that includes one or more mega queries. The compact query plan enables rapid traversal of a simplified query tree, increasing the speed of processing, and reducing the amount of memory used.

The CQP often provides a query tree of dramatically reduced "height" in comparison to the original query plan. The height of the query tree corresponds to the order of the exponent of the polynomial complexity—so it can be very useful to lower the height of the tree, reducing the complexity of optimization in many cases.

Thus, in many embodiments, the original query plan is transformed into a CQP comprising at least two source nodes coupled to at least one abstract node and at least one singleton node. The CQP has source nodes that include scan operations to source tables; singleton nodes that include a single operation selected from Aggregate, Union, Order by, null accepting Full Outer Joins (FOJs); and Abstract nodes that include a set of operations selected from Cartesian Product, Evaluation, Filter, Left Outer Join (LOJ) and null rejecting FOJs. In the CQP, the children of an Abstract Node can be source nodes or singleton nodes. The CQP contains all the information that is necessary to generate a query tree equivalent to the original query plan.

Abstract node operations can be partitioned into sets of operations of two types:

partitions that contain a single operation that is a null rejecting LOJ partitions that contain multiple operations, such that for any two operations O1 and O2 of a partition where O1 executes before O2 in the original query plan, O1 can be executed after O2 if O1 is upward compatible with O2.

In most embodiments, the CQP groups the maximum number of items that can be put together in isolation in abstract nodes. This can provide faster processing in subsequent activities.

Therefore, many embodiments of the invention may be realized, and each can be implemented in a variety of architectural platforms, along with various operating and server systems, devices, and applications. Any particular architectural layout or implementation presented herein is therefore provided for purposes of illustration and comprehension only, and is not intended to limit the various embodiments.

Many embodiments of the invention make use of the observation that most mega queries in operational BI applications are "narrow", which means that the minimum set of data that must be accessed from the source systems to enable the execution of the query is quite small. Building upon this observation, reduction of the data processing set can be useful to reduce the cost of query processing.

Thus, to reduce the cost of original query plans that are large, a new model to represent the execution plan of a query, called the CQP, is introduced. This model can be viewed as the compact normal form of an original query that groups all of the database operations that could possibly be permuted into macro-nodes. In this way, a very large classical query processing tree can be compacted into a tree that has a reduced height, with fewer nodes. A "classical query processing tree" is a tree comprising the following nodes (operators): (Inner) Join, Filter, Evaluation, LOJ, FOJ, Aggregate Group by, Order by, and Union. In this case, an operator takes as input one or more data streams and produces an output data stream. The edges in the query processing plan represent the data flow among the operators.

In addition, two optimization algorithms can be used that operate on the CQP to find a derivative query execution plan that is expected to have a small data processing set (provided that the original query is narrow). The first algorithm computes maximal sub-queries that can be pushed down to the source systems. This algorithm has a linear complexity according to the number of nodes of the classical query processing tree. The second algorithm searches for semi-join reducers that can be used to reduce the number of rows that are returned by each sub-query to a source system. This algorithm has a worst case polynomial complexity in $O(n^p)$ where n is the number of source nodes and p is the height of the CQP.

A typical operational BI architecture distinguishes three main logical layers: a Data Source Layer that comprises all the required data sources needed by operational BI reporting; a Semantic Layer that provides a layer of virtual "business objects", called a "universe" in SAP BusinessObjects terminology, that can be easily composed to build reports; and a Consumption Layer that comprises multiple client tools such as reporting, dashboards, planning, data explorer, etc. The Semantic Layer and the Consumption Layer are often packaged into a single Business Suite of applications.

The Semantic Layer itself may offer several functionalities. These may include a data access functionality, a data foundation functionality, and a business object functionality. The data access functionality stands at the bottom level, and provides a unified interface to retrieve metadata and query the set of distributed and heterogeneous data sources. The data foundation functionality may stand at the middle level, to enable the creation of multiple entity-relationship models from the metadata exposed by the data access layer. The business object functionality enables the creation of so-called "business objects" (such as measures, dimensions, details, etc) that can be freely composed to create ad-hoc business object (BO) user queries that are consumed by the consumption tools (e.g., reporting or dashboarding tools).

In order to facilitate the deployment of operational BI reports, the Semantic Layer attempts to provide rapid creation of data models from multiple data sources without, for example, the development of intermediate data marts. Enterprise Information Integration (EII) systems, also called mediation systems, may play a useful role in the architecture of the Semantic Layer because they enable the creation and querying of virtual databases, henceforth called target schemas, over a set of distributed and heterogeneous data sources with a low TCO (Total Cost of Ownership).

An EII system may be implemented as middleware that includes wrappers and a query engine. Wrappers expose the metadata relational schema of the data sources called source tables. A wrapper describes the capabilities of the underlying data source in terms of, for example, SQL query processing over the source tables. The Query Engine (QE) then provides an SQL interface to express multi-source queries referring to source tables or target tables (i.e., tables belonging to target schemas).

At the time of target schema creation, a source to target mapping is created between the source tables and the target tables belonging to a given target schema. An arbitrary number of intermediate target tables can be used within this mapping to facilitate its definition.

At the time of executing a multi-source SQL query by the Query Engine, the query is first unfolded using the mapping definition of the target tables and then decomposed into a set of sub-queries. The sub-queries are processed by the wrappers and an assembly query that is processed by the QE using the results returned by the sub-queries. This decomposition is called a query processing plan, and represents the original query plan that serves as input to various embodiments of the invention.

A target schema is driven by the reporting requirements that it serves, so its design often follows a top-down approach. Thus, the target schema is usually created before the mapping actually occurs.

In operational BI reporting applications, target schemas often have a "star"-like configuration, which distinguish fact tables from dimension tables. Fact tables can either be measures (in the traditional sense of multi-dimensional data modelling), such as sales-unit or sales-dollar, or entity data that are described using multiple dimensions, such as a customer or an archive box. Indeed, customer data can be that subject of analysis that is described using different dimensions (e.g., location, organization, market position, . . . ). So, a customer is not necessarily a dimension; this depends on the viewpoint of the business process with which the operational BI model is associated. Finally, dimension tables are frequently denormalized because these tables are virtual read-only tables and it makes no sense from a reporting point of view to decompose them into smaller tables.

There are at least three sources of complexity with respect to target schemas in operational BI reporting. These include source data fragmentation, complex logic for contextual information, and data cleaning operations.

The first source of complexity arises from the fact that source data are frequently fragmented—for a variety of reasons. Consider a Customer dimension table with attributes such as identification (ID), name, address, home-phone, nation-name, etc. Vertical partitioning may occur because the attributes of a customer originate from multiple source tables (e.g., detailed data coming from Customer Support). Horizontal partitioning may occur because the source tables have been partitioned into multiple databases. For instance, Customer data can be co-located with order data, while Customer Support data can be partitioned into regional databases. In this example, this means that the mapping definition of the Customer table will include a first level of union operations to address horizontal partitioning and then a level of join operations (join, outer joins) to address vertical partitioning.

Master databases may operate to reduce the complexity created by fragmentation because centralized consolidated tables (e.g., master tables) can be leveraged. This may occur for dimension data, such as a Customer table. However, it does not eliminate data fragmentation. First, not all Customer data is kept in a customer master table, and additional data can be aggregated on demand. Second, lookup tables are sometimes built to keep track of the relationships between the master table and the original source tables from which the master table has been built. Indeed, applications may continue to rely on using the original tables instead of the consolidated master tables. These lookup tables are usually co-located with the original source tables. Third, fact tables may also rely on fragmented source data.

The second source of complexity arises from the complex logic that can be associated with a fact table, especially when it represents contextual information. Indeed, contextual information may include business indicators that are not readily available in the underlying data sources, but still form part of various computations.

Consider, as an example, a fact table called Box_Destruction that describes all the archive boxes that are eligible for destruction. The data sources store information about archive boxes (called "boxes"), their customer, the organization within the customer, etc. However, whether a box is eligible for destruction is a business notion that needs to be computed. In this example, a box must be preserved if it has not passed its expiration date or: case 1—it is on hold by the company or, case 2—it is on hold by the parent company or, case 3—it is on hold by a division or, case 4—it is on hold by a department.

Each case yields an intermediate target table involving joins or LOJs and selections, and the union of these target tables forms all the "box on hold" cases in a Box_Hold table. Finally, the Box_Destruction tuples are obtained by taking the boxes that are "not in" the Box_Hold table, which again could be implemented by an LOJ operation. So, the computation of the Box_Destruction table uses an interleaved combination of joins, LOJs, selections and unions. In addition, if box data are fragmented using horizontal partitioning, the computation is done for each partition and then a union operation will yield the ultimate result.

The third source of complexity arises from performing data cleaning operations to establish the relationship between data from different sources and to ensure the accuracy of the target data. Cleaning issues addressed by the EII mapping should be translatable into tuple-transformations, which means that the transformation operations can be applied to each tuple individually. The impact on source to target mappings is the presence of multiple evaluation expressions (aka functional expressions) including case—when expressions and string manipulation functions.

Mega queries are SQL queries which reference a large number of source tables (e.g., several hundreds of such tables, to more than thousands) in their FROM clause. Such queries can be issued by operational BI reports as a result of the complexity of the source to target mappings used to define the underlying target schemas. This however does not equate to a comparable number of joins since horizontal partitioning also creates many union operations.

Building upon the previous example taken from a customer use case, there are more than 300 databases of up to 100 GB each containing source data about archive boxes. There is a central master database that holds dimension data such as customer and customer's organization. All the data about the boxes and their contents is horizontally partitioned over about 80 different databases within each region. The data about the warehouses is also horizontally partitioned over ten different databases.

In a business process workflow, an operational BI report makes use of contextual data that describe detailed customer information associated with boxes eligible for destruction and the warehouses where the boxes are kept. There is also the possibility of drilling down into a particular archive box to see a list of stored files associated with the box.

The target schema exposed for this particular operational BI report might then contain a variety of tables, including Customer, Box_Destruction, Warehouse, and Files. The query used to report information on boxes eligible for destruction is merely expressed by joining target tables Customer, Box_Destruction, and Warehouse. Customer has a relatively simple mapping from the master database that mixes customer and organization data. Box_Destruction has a more complex mapping sketched in the previous section. Finally, Warehouse may have a mapping that is more elementary. However, after unfolding, a query may reference over 1,000 source tables from more than 80 different databases. Indeed, each case for defining Box_Hold involves 3 to 5 joins, with a total of about 15 tables for each partition. This is multiplied by the number of roughly 80 partitions, yielding a total of 1,200 tables. A total of roughly 15 tables is added for the warehouse and master data. The filters that make this query narrow are those that filter on a customer ID and a region.

Here, we define an original query processing plan P (or, simply original query plan) for a query Q as comprising a tree having the following nodes (operators): (Inner) Join, Filter, Evaluation, LOJ, FOJ, Aggregate Group by, Order by, and Union. An operator takes as input one or more data streams and produces an output data stream. The edges in the query processing plan represent the data flow among the operators. The "Evaluation" operator takes as input one table $R(A1, \ldots, An)$ and produces one table $R'(A1, \ldots, An, E)$ where E is a calculated column associated with a function f that takes as arguments a subset of the columns $A1, \ldots, An$. Assuming that E is defined as a function $f(A1, \ldots, An)$, if t is a tuple of R then there exists a tuple t' in R' such that $t'.E=f(t.A1, \ldots, t.An)$ and $t'.Ai=t.Ai$ for i such that $1 \leq i \leq n$.

In an EII system, the following macro-components of a query processing plan are distinguished: sub-queries from the data sources, noted SQ, sometimes called "data providers" ([SQ]S denotes a sub-query SQ on source S); and an assembly query AQ run in the EII Query Engine.

The notion of a data processing set for a query plan P of query Q is denoted as dps(P(Q)), representing the number of rows that are read from the data sources by the EII Query Engine in order to complete the processing of AQ.

The data processing set of a sub-query SQi, denoted dps(P(Q), SQi), is defined as the number of rows returned by SQi in query plan P(Q). If N is the number of sub-queries in P(Q), then $$dps(P(Q)) = \sum_{i=1}^{N} dps(P(Q), SQi).$$

Some queries for operational BI reporting are narrow queries, which means that their data processing set can be quite small although the source tables that they reference can be very large. For instance, some fact tables issued from large data warehouses can be extremely large.

The reason for the existence of narrow queries is that highly repeatable decisions in workflow processes can often be captured by highly parameterized queries in operational BI reports. Usually, the query parameters represent filters on dimension tables, such as a customer ID value, a region, a quarter or a range of dates, a product ID, etc. One or more of these filters can be quite selective, since it may correspond to the specific context of a particular instance of a business process. For instance, the customer ID of the caller in a self-service system will be relatively specific, although the region to which the customer belongs is not. In the example above, dealing with archive boxes, 60% of the mega queries reference more than 300 tables, while 12% reference more than 1,000 tables. However, 83% of the mega queries are narrow queries that can be optimized and processed using various embodiments within a range of 20 seconds to 2 minutes, using readily available processing hardware.

Narrow operational BI queries are allowed to query production systems (e.g., OLTP or ERP systems) for accessing their contextual data because they generally issue small read transactions. Thus, they do not usually result in workload balancing problems. In addition, a notable proportion of queries return a small result set because operational workers prefer to process condensed information to make decisions.

It may thus be useful to find a CQP that reduces the value of dps(P(Q)) with respect to the original query plan. Reduction does not necessarily produce the lowest cost query processing plan, but it often provides a good approximation for at least two reasons. First, data transfer often turns out to be a dominant cost factor in query processing by an EII. This is more in evidence for operational BI queries that may access very large tables. Second, in cases where there exists a query plan with a small data processing set (e.g., narrow queries), such a (reduced) plan provides an assembly query that can be run quickly, without further ordering of operations. Derivative query plans with a small data processing set can provide a dramatic improvement in terms of performance.

Query plan optimization is often challenged by the size of the search space created by a mega query. Conventional techniques using rule-based optimization, where rewritten rules are recursively considered for applications starting from the root node of a query plan, do not apply because they do not scale both in time and space. Similarly, dynamic programming techniques for join re-ordering do not scale on mega queries, although they may work on smaller (partial) plans.

In the following discussion, two design decisions for an optimization model are presented: the decomposition of the optimization process into sequential stages, and the design of a new compact representation of a query plan that significantly reduces the cost of query optimization with respect to dps(P(Q)).

The optimization strategy can be decomposed into stages, where each stage focuses on a particular type of optimization. The optimization stages may be processed sequentially, and in most embodiments, only once. They are oriented toward providing a low worst case time complexity (linear or polynomial), and low memory consumption, so as to favor "in place" transformations that avoid the cloning of query plans (costly in terms of memory space). In most embodiments, the search for semi-join reducers precedes the ordering of joins. Although this approach will not necessarily produce the best query plan in all cases, it usually reduces the size of the data processing set. The following stages will now be described: operation simplification and push-down, searching for maximal sub-queries, and semi-join data provider reduction.

Query simplification techniques may include transformations, such as the removal of useless duplicate columns in DISTINCT or GROUP BY clauses, the removal of ORDER BY operators, the replacement of UNION DISTINCT by UNION ALL, the removal of useless columns/expressions that are not used/projected in the upper part of a query plan, the grouping of common expressions, etc. Operation push down can be implemented by exploiting the standard commutative and associative properties of operators, including filters, evaluations, aggregates and unions. Some properties that can be exploited during these transformations include the dependencies between variables, variable equivalence for transitive propagation, and behavior with respect to null values. These transformations prepare the way for the computation of maximal source sub-queries.

Some transformations concern the simplification of FOJ and LOJ operations. These simplifications may utilize the following properties.

Property 1: Let E be the expression given by E=(Filter(LOJ (R1, R2), cond2), cond1), where cond1 represents the condition of Filter and cond2 the condition of LOJ. If cond1 filters out the tuples which have a null value on their R2 attributes, then E is semantically equivalent to the expression E'=(Filter (Join(R1, R2), cond2), cond1), in which Join represents an inner join operation.

Property 2: Let E be the expression given by E=(Filter(FOJ (R1, R2), cond2), cond1). If cond1 filters out the tuples which have a null value on their R1 attributes, then E is semantically equivalent to the expression E' given by E'=(Filter(LOJ(R1, R2), cond2), cond1).

Property 3: Let E be the expression given by E=(LOJ(R0, (FOJ (R1, R2), cond2)), cond1) where the left operand of the LOJ is R0 and the right operand is (FOJ(R1, R2), cond2) and cond1 is its condition. If cond1 filters out the tuples having a null value on their R1 attributes, E is semantically equivalent to the expression given by E'=(LOJ (R0, (LOJ (R1, R2), cond2)), cond1). This particular simplification also applies in the case when the FOJ is the left operand of LOJ and R0 is the right one.

To further address the scalability problem of mega queries, optimizations may be performed on a compact representation of the original query plan, or the CQP. The CQP groups into a same macro-node, called an Abstract Node, all operations that can be arranged in different orderings, with no permutations existing between the operations of two distinct Abstract Nodes. Thus, an Abstract Node contains the maximal set of operations for which ordering arrangements are possible. This property exploited by the optimization techniques disclosed herein can significantly reduce query plan complexity. The following definitions may be useful to enhance understanding of various concepts associated with providing a CQP.

Definition 1 (Null accepting or rejecting condition): If Exp(x1, . . . xn) denotes a condition in conjunctive normal form with variables x1 to xn, then Exp is said to be null rejecting condition if, for each i, $1 \leq i \leq n$, (x1=null) implies that Exp(x1, . . . xn) evaluates to false. Otherwise, Exp is said to be a null accepting condition.

Definition 2 (Null accepting or rejecting LOJ/FOJ): By extension, if an LOJ (resp. FOJ) has a condition that is null accepting, then the LOJ (resp. FOJ) is said to be null accepting and is denoted LOJnull (resp. FOJnull). An LOJ (resp. FOJ) that is not null accepting is said to be null rejecting and is denoted by LOJrej (resp. FOJrej). The designation LOJ by itself stands for any kind of LOJ (i.e., null accepting or null rejecting)

Definition 3 (Null propagating evaluation): Let $Eval(x1, \ldots xn)$ denote an evaluation operation with variables x1 to xn. Eval is said to be a null propagating evaluation operation, denoted Enull, if there exists i, $1 \le i \le n$, such that (x1=null) implies that $Eval(x1, \ldots xn)$ evaluates to null. If E is not a null propagating evaluation, it is denoted Enot_null. E stands for any evaluation without distinction of its null propagation property. Finer sufficient conditions may be used in practice but these details are not set forth here.

Definition 4 (Compact Query Plan): A CQP comprises a tree data structure that may have three types of nodes:
  Abstract nodes: contain a query plan restricted to the following operators: Cartesian product (C), Filter (F), Evaluation (E), LOJ, and/or FOJ that are null rejecting (FOJrej).
  Singleton nodes: contain one of the following operators: Aggregate Group by (A), FOJ that are null accepting (FOJnull), Order by (O), or Unions (U).
  Source nodes: contain a sub-query to a data source.

Before describing the structure of an Abstract Node and the construction of a CQP from a query plan, the notion of a preserved path is introduced. The expression "query plan" and "original query plan" is reserved to represent a classical query plan as defined earlier.

Definition 5 (LOJ preserved path): Let $(N1, \ldots, Nk)$ be a descending path in a query plan such that Nk is a source table or Nk is in $\{A, O, FOJ, U\}$, and for each i, $1 \le i \le k-1$, (i) Ni is in $\{C, E, F\}$ or Ni=LOJ and Ni+1 is the outer side of Ni. Then $P=(N1, \ldots, Nk-1)$ is said to be an LOJ preserved path in the query plan.

Definition 6 (FOJ preserved path): Let $(N1, \ldots, Nk)$ be a descending path in a query plan such that N1 is an FOJ, and Nk is either a source table or a node in $\{Enot\_null, LOJnull, F, C, A, U, O\}$, and for each i, $1 \le i \le k-1$, Ni is either (i) an FOJ or (ii) a null propagating evaluation node, or (iii) Ni is a null rejecting LOJ and Ni+1 is the outer side of Ni. Then $P=(N1, \ldots, Nk-1)$ is said to be an FOJ preserved path in the query plan.

Definition 7 (variable node): Let P be an LOJ or FOJ preserved path and N be a child node of a node of P, with N either a source table or a node in $\{A, O, FOJnull, U\}$. A variable node is associated with P that contains the set of output variables of node N.

The following definition captures a logically essential and necessary condition for pushing an operation node upward in an ascending path of a query plan without changing query semantics.

Definition 8 (upward compatible operation): Let $P=(N1, N2, N3)$ be an ascending path in a query plan. Let Required_N be the set of variables required in an operation N. Let Output_N be the set of variables provided by an operation N to its parent node. Then $N_2$ is said to be upward compatible with $N_3$ iff Required_$N3 \cap$(Output_$N_2$-Output_$N_1$)=$\emptyset$. By extension, let $P=(N_1, N_k)$ be an ascending path of a query plan, then $N_2$ is said to be upward compatible with $N_k$ iff for each node $N_i$, $3 \le i \le k$, $N_2$ is upward compatible with $N_i$.

Some properties of preserved paths are now introduced.

Lemma 1: when $P=(N1, Nk-1)$ is an LOJ preserved path and Nk is a child node of Nk-1 such that Nk=FOJrej, the following properties may be observed:
(1) For any pair of nodes (Ni, Nj) of P such that $i \ne j$ and i, j are in $\{1, \ldots, k-1\}$ and Nj is upward compatible with Ni, the action of pushing Nj upward as a parent of Ni in the query plan preserves query semantics equivalence;
(2) Let N be any node of P in $\{Enot\_null, F, C, LOJnull\}$ such that Nk is upward compatible with N, the action of pushing Nk upward as a parent of N in the query plan does not preserve query semantics equivalence;
(3) Let N be any node of P in $\{Enull, LOJrej\}$ such that Nk is upward compatible with N, the action of pushing Nk upward as a parent of N in the query plan preserves query semantics equivalence; and
(4) For any node NI such that NI is a child node of Nk and NI not in $\{LOJrej, Enull\}$, let N be a node of P such that NI is upward compatible with N, the action of pushing NI upward as a parent of N in the query plan does not preserve query semantics equivalence.

The following case analysis demonstrates the first property. Consider that Nj=Ni+1, because by Definition 8 this is a necessary condition. If this is the case, then:
  Ni=LOJ and Ni+1=F: given the condition that Nj is upward compatible with Ni, this holds by the property LOJ (Filter(R1,cond1), R2)=Filter(LOJ(R1, R2), cond1).
  Ni=F and Ni+1=LOJ: this uses the same property as before.
  Ni=E and Ni+1=LOJ: given the condition that Nj is upward compatible with Ni, this holds by the property E(LOJ (R1, R2))=LOJ(E(R1), R2).
  Ni=LOJ and Ni+1=E: same property as before.
  Ni=LOJ and Ni+1=LOJ: this holds by the property LOJ (LOJ (R1, R2), R3)=LOJ (LOJ (R1, R3), R2).
  Ni=E and Ni+1=E: assuming that Nj is upward compatible with Ni, Ni cannot use as an argument a variable produced by Ni+1. Thus, the two Eval operations are independent and permutable.
  Ni=F and Ni+1=E: by assumption, Ni cannot use in its condition a variable produced by Ni+1. Thus, the two operations are independent and are permutable.
  Ni=F and Ni+1=F: this holds by the associativity property of Filters.
  Ni=C and Ni+1=F.
  Ni=C and Ni+1=LOJ.
  Ni=C and Ni+1=Eval.
  Ni=C and Ni+1=C.

The following case analysis demonstrates the second property. Here it is sufficient to consider the case when N=Nk-1, since if Nk cannot be pushed upward as a parent of Nk-1, it cannot be pushed upward as a parent of the parent node of Nk-1 either.

FIG. 1 illustrates query plan case analyses for N and N=F, according to various embodiments of the invention. To show that N=Enot_null, a counter-example 100 is provided. Consider tables R1(A1, A2) and R2 (B1) and the expression given in FIG. 1 (of Evalnot_null and FOJ). The tuples R1[a1, a2] and R2[b1] suffice to show that the transformation is not valid since the result set (A1, A2, B1, C) will not be identical.

To show that N=F, another counter-example 102 is provided. Assume the existence of tables R1(A) and R2(A), along with the examples of FIG. 2 (of Filter and FOJ). Further, assume the existence of tuples R1[a1], and R2[a1]. On the left hand side of the transformation the FOJ returns the tuples FOJ[a1, a1]. The final result is a tuple [a1, a1]. However, on the right hand side, the filter operation returns an empty set and the final result is [null, a1], which is a different result.

Figure 2:
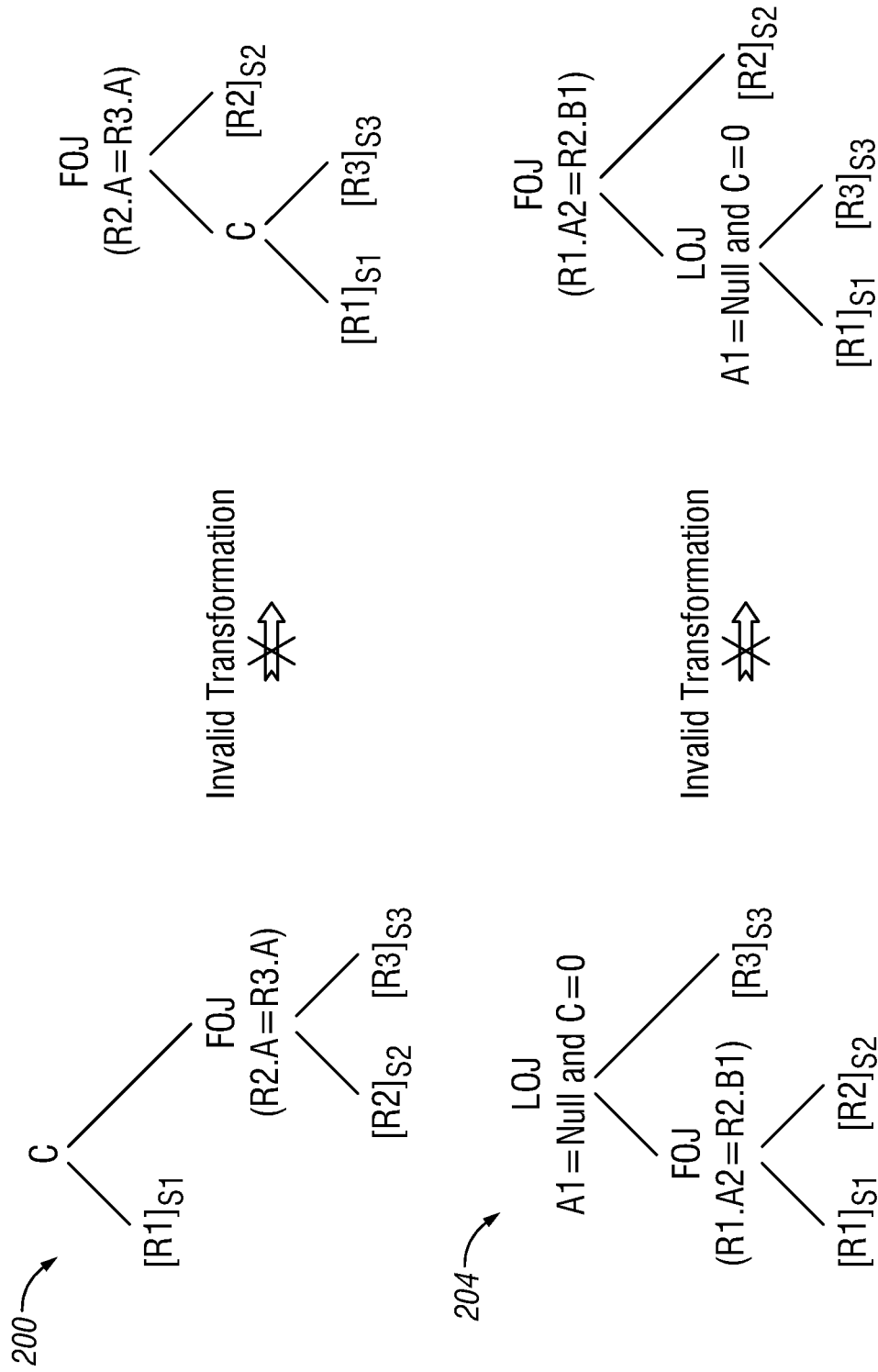
FIG. 2 illustrates query plan case analyses for N=C and N=LOJ$_{null}$, according to various embodiments of the invention.

FIG. 2 illustrates query plan case analyses for N=C and N=LOJ$_{null}$, according to various embodiments of the invention. To show that N=C, a counter-example 200 is provided. Assume the existence of tables R1(A), R2(A) and R3(B), and of tuples R1[a1], R2[a2], and R3[b]. On the left hand side of the transformation the FOJ returns the tuples FOJ[a1, null] and FOJ[null, b]. The final result includes the tuples [a1, null, a2] and [null, b, a2]. However, on the right hand side, the C operation returns [a1, b] and the final result is [a1, b, null] and [null, null, a2], which is a different result.

To show that N=LOJnull, another counter-example 204 is provided. Assume the existence of tables R1(A1, A2), R2 (B1), and R3(C), and of the tuples R1[a1, a2], R2[b1] and R3[0]. These serve to show that the transformation is not valid, since the result set (A1, A2, B1, C) will not be identical.

The following case analysis demonstrates the third property. Here two cases of N are distinguished:

N=Enull: given the condition that Nk is upward compatible with N, this holds by the property: Enull (FOJ (R1, R2))=FOJ(Enull (R1), R2).

N=LOJrej: given the condition that Nk is upward compatible with N, this holds by the property: LOJrej(FOJ(R1, R2), R3)=FOJ(LOJrej (R1, R3), R2).

The following case analysis demonstrates the fourth property. Here, it is sufficient to consider the case when N=Nk−1. The analysis on N and NI includes:

For the cases when NI is in {Enot_null, F, C, LOJnull}, see the counter-examples associated with the second property.

For the cases when NI in {Enull, LOJrej}, see the counter-examples associated with the third property.

In Lemma 1, the cases when Nk is in {A, O, U} are not analyzed because it is assumed that all operations (in particular, filters) have been pushed down in the original query plan.

Some properties of FOJ preserved paths are now introduced.

Lemma 2: when P=(N1, . . . , Nk−1) is an FOJ preserved path and Nk is a child node of Nk−1 such that Nk in {Enot_null, LOJnull, F}, then the following properties may be observed:

(1) For any pair of nodes (Ni, Nj) of P such that i≠j and i, j are in {1, . . . , k−1} and Nj is upward compatible with Ni, pushing Nj upward as a parent of Ni in the query plan preserves query semantics equivalence;

(2) Let N be any node of P in {FOJ} such that Nk is upward compatible with N, then pushing Nk upward as a parent of N in the query plan does not preserve query semantics equivalence;

(3) Let N be any node of P in {Enull, LOJrej} such that Nk is upward compatible with N, then pushing Nk upward as a parent of N in the query plan preserves query semantics equivalence; and (4) For any node NI such that NI is a child node of Nk and NI not in {LOJrej, Enull}, let N be a node of P such that NI is upward compatible with N, then pushing NI upward as a parent of N in the query plan does not preserve query semantics equivalence.

The following analysis demonstrates the first property. Here cases involving Ni and Nj are reviewed, and without loss of generality it is given that Nj=Ni+1. If this is the case, then:

Ni=FOJ and Ni+1=FOJ: given the assumption that Nj is upward compatible with Ni, this holds by the associativity property FOJ (FOJ (R1, R2), R3)=FOJ (FOJ (R1, R3), R2).

Ni=FOJ and Ni+1=Enull: see the demonstration for the third property of Lemma 1.

Ni=Enull and Ni+1=FOJ: see the demonstration for the third property of Lemma 1.

Ni=FOJ and Ni+1=LOJrej: see the demonstration for the third property of Lemma 1.

Ni=Enull and Ni+1=LOJ: subsumed by the demonstration for the first property of Lemma 1.

Ni=LOJ and Ni+1=Enull: subsumed by the demonstration for the first property of Lemma 1.

Ni=LOJ and Ni+1=LOJ: see the demonstration for the first property of Lemma 1.

Ni=E and Ni+1=E: subsumed by the demonstration for the first property of Lemma 1.

The following analysis demonstrates the second property. Here, cases involving Nk are reviewed. It is sufficient to consider the case when N=Nk−1 since if Nk cannot permute with Nk−1, it cannot permute with a parent node of Nk−1 either. If this is the case, then:

Nk=Enot_null: see the demonstration for the second property of Lemma 1.

Nk=LOJnull: see the demonstration for the second property of Lemma 1.

Nk=F: see the demonstration for the second property of Lemma 1.

For the demonstration of the third property, see the demonstration for the third property of Lemma 1. For the demonstration of the fourth property, see the demonstration for the fourth property of Lemma 1.

Finally, another useful property of preserved paths is now introduced.

Lemma 3: when N0 is an LOJ (LOJrej or LOJnull) node, N1 is its non-outer child, and P=(N1, . . . , Nk−1) is a (LOJ or FOJ) preserved path, then the following properties may be observed:

If N0=LOJrej, for any i in {1, . . . , k−1} such that Ni is not in {Enull, LOJrej} and Ni is upward compatible with N0, then pushing Ni upward as a parent of N0 does not preserve query semantics equivalence; and If N0=LOJnull for any i in {1, . . . , k−1} such that Ni is upward compatible with N0, then pushing Ni upward as a parent of N0 does not preserve query semantics equivalence.

The structure of an Abstract Node is now described. An Abstract Node is defined to be a node that comprises:

a set of Block Expressions (BE) containing a set of LOJ preserved paths (including their variable nodes), a set of FOJ blocks (BFOJ) also containing a set of FOJ preserved paths (including their variable nodes), a set of LOJ blocks, and a set of precedence relationships between blocks.

It is noted here that the term "blocks" is used interchangeably herein with the term "sets", both meaning a collection of objects—in this case, the objects normally comprise operations. Intuitively, blocks are built such that all operations inside a block can be freely re-ordered assuming that they satisfy the natural constraint of upward compatible operations. The concept of precedence relationships, represented by precedence links, or "p-links", are introduced to determine the ordering constraints under which the blocks of an abstract node should be executed. A p-link B1→B2 is thus created to prevent nested executions between operations of B1 and operations of B2.

A method that operates to construct a CQP from an original query plan is now presented. Here, the blocks that form Abstract Nodes are determined, as well as the p-links contained inside the Abstract Nodes.

To build a CQP, and (original) query plan is used as input. The output is a CQP that includes blocks and p-links inside Abstract Nodes. The basic method involves traversing the original query plan from its root in a depth first, left to right descending manner as follows.

In the first case, if an operator A, O, FOJnull, or U is encountered in the query plan, then a singleton node N is formed in CQP. Its parent node (if it is not the root) in the CQP is the node of the CQP that contains the parent of N in the original query plan.

In the second case, if an operator in {E, C, F, LOJ, FOJ} is encountered in the query plan it forms the root, called rootAN, of an abstract node AN which is built in two parts. Part 1 uses the following rules:

Rule 1. if rootAN is not an FOJ, all LOJ preserved paths rooted at rootAN form a block expression of AN.

Rule 2. if rootAN is an FOJ, all FOJ preserved paths rooted at rootAN form an FOJ block of AN.

Rule 3. if N is an FOJ node that is a child of a node of any block expression B of AN, all FOJ preserved paths rooted at N form an additional FOJ block B' of AN, and there is a p-link from B' to B.

Rule 4. if N is the non-outer side node of an LOJ node of any block expression or FOJ block B of AN, and N is in {E, C, F, LOJ}, all LOJ preserved paths rooted at N form an additional block expression B' of AN, and there is a p-link from B' to B.

Rule 5. if N is the non-outer side node of an LOJ node of any block expression or FOJ block B of AN, and N is an FOJ, all FOJ preserved paths rooted at N form an additional FOJ block B' of AN, and there is a p-link from B' to B.

Rule 6. if N is a child node of an FOJ node of an FOJ block B of AN, and N is in {E, C, F, LOJ}, all LOJ preserved paths rooted at N form an additional block expression of AN, and there is a p-link from B' to B.

In the second case, part 2, if N is a null rejecting LOJ in a path P of a block B, then extract N from B, create an LOJ block B' containing N, and use the following rules for the node N' that is the non-outer side child of N:

Rule 7. If N' is a singleton node or a source node then its corresponding variable node is removed from P and associated with B'.

Rule 8. If N' is contained in a block expression or an FOJ block B'', then remove the p-link from B'' to B (created by rules 4 or 5) and add a p-link from B'' to B'.

The parent node (if it is not the root) of an abstract node AN is the node of the CQP that contains the parent node of rootAN in the original query plan.

In the third case, if a scan operator of a source table is encountered then a source node N is formed in the CQP. Its parent node in the CQP is the node of the CQP that contains the parent of N in the original query plan.

This ends the rule structure of an embodiment that operates to build a CQP. As explained earlier, variable nodes are formally associated with preserved paths. By extension, a block is associated with the variable nodes of the preserved paths that it contains. It should be noted that the "variable nodes of a block" are defined as the set of variable nodes associated with the preserved paths contained in the block.

Figure 3:
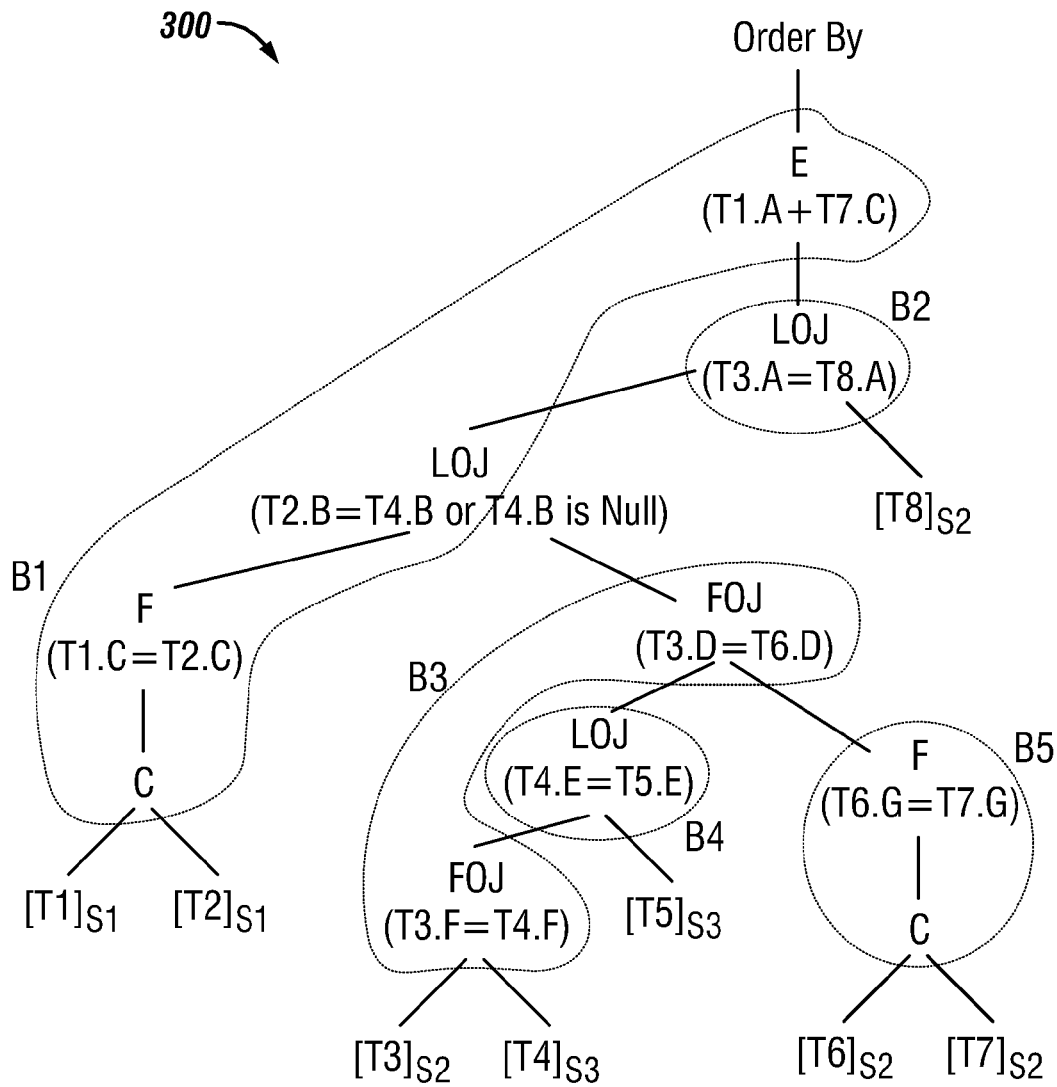
FIG. 3 illustrates construction of an abstract node in a compact query plan (CQP), according to various embodiments of the invention.

FIG. 3 illustrates construction of an abstract node 300 in a compact query plan (CQP), according to various embodiments of the invention. Blocks are depicted using dotted lines in FIG. 3.

By applying the process of building a CQP described above to the query plan of FIG. 1, a singleton node (Order By) is obtained, followed by an abstract node AN consisting of two block expressions B1 (via rule 1 above) and B5 (via rule 5) and an FOJ block B3 (via rule 3 above). Then the two null rejecting LOJ are extracted to get blocks B2 and B4. Note that the LOJ node inside B1 is a null accepting LOJ. Finally, each source table forms a source node.

Figure 4:
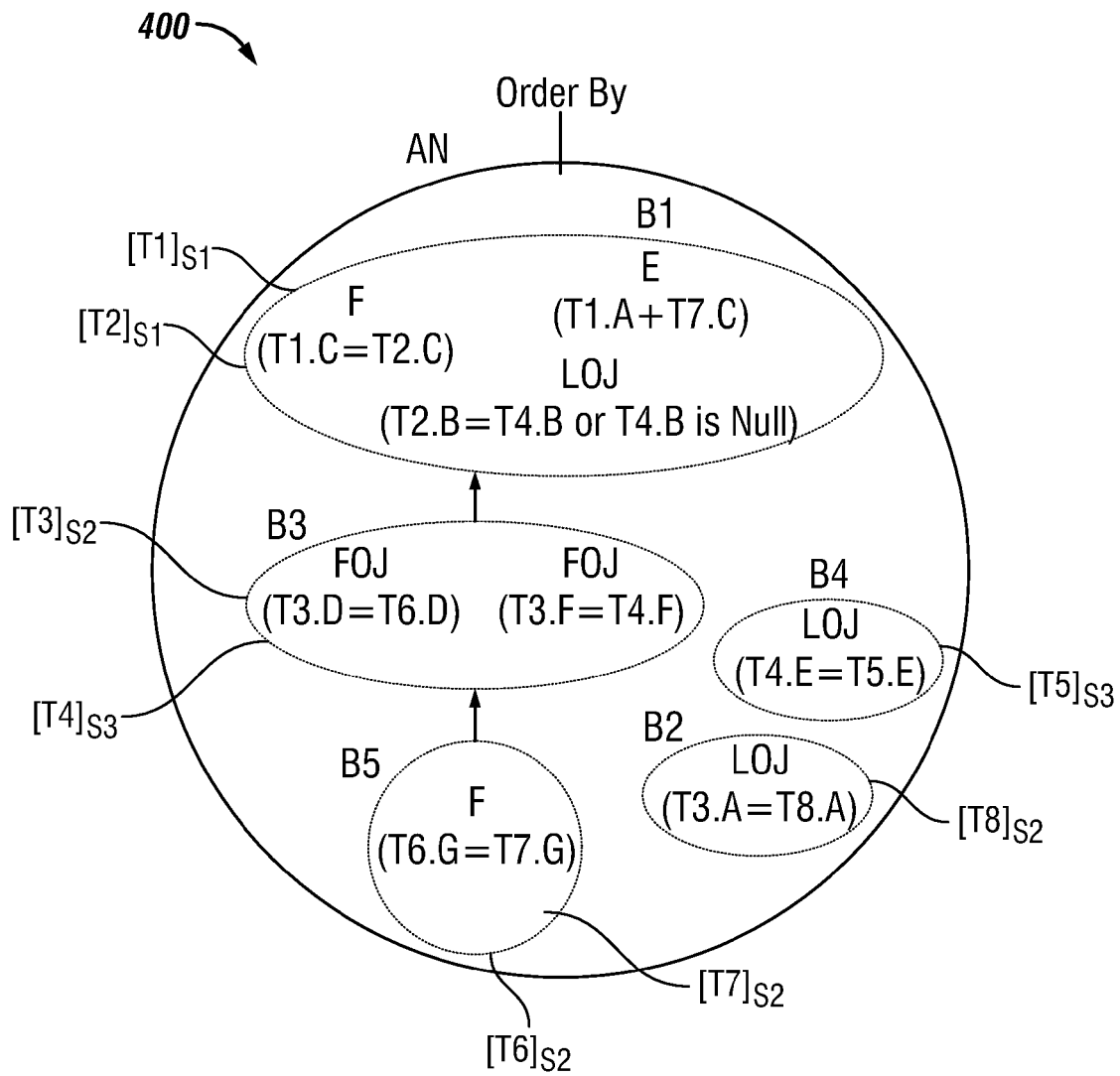
FIG. 4 illustrates a CQP corresponding to the query plan of FIG. 1, according to various embodiments of the invention.

FIG. 4 illustrates a CQP 400 corresponding to the query plan of FIG. 1, according to various embodiments of the invention. Here one possible representation of the resulting CQP 400 is shown. Variable nodes are represented using arcs relating source nodes to blocks. The variable nodes of B1 contain all the variables coming from T1 and T2 (via their preserved paths). The variable nodes of B3 contain all the variables coming from T3 and T4 (via FOJ preserved path) and the variables coming from T6 (via rule 7 above). The variable nodes of B5 contain all the variables coming from T6 and T7 (via their preserved paths). Source nodes are represented using a notation $[T]_s$ where T is a table name and S is a data source name.

Figure 5:
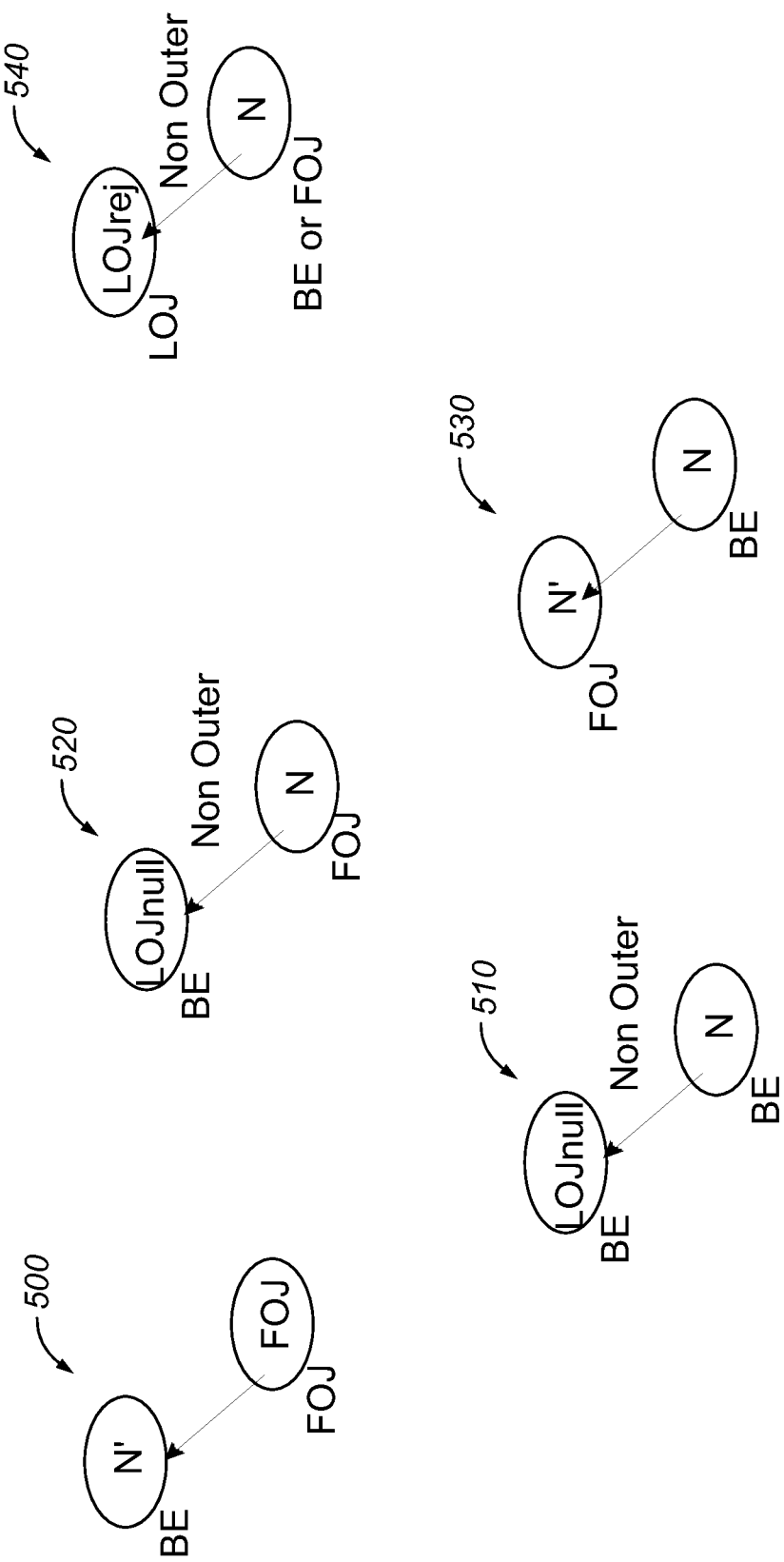
FIG. 5 illustrates exhaustive cases for precedence links (p-links) within an abstract node, according to various embodiments of the invention.

FIG. 5 illustrates exhaustive cases 500, 510, 520, 530, 540 for precedence links (p-links) within an abstract node, according to various embodiments of the invention. Considering all possible pairs of types of blocks in an Abstract Node, the diagrams in FIG. 5 describe all the cases 500, 510, 520, 530, 540 of p-links created by the method of building a CQP described previously. Each circle represents a block, and the arrows represent the parent-child relationships that exist in the original query plan, as well as the p-links between blocks. It can be shown that this embodiment of a method for building a CQP computes exactly all the possible p-links within Abstract Nodes.

As a matter of convenience, the query tree of an Abstract Node (AN) computed by the method that operates to construct a CQP from an original query plan, described above, is denoted Qtree(AN), and is defined to be the subtree of the input query plan that exactly contains all the nodes of AN. P-links may be defined by assuming that B1 and B2 are two blocks of an abstract node AN such that the root node of B1 is a child node of some node in B2 in Qtree(AN). When this is the case, there is a precedence link, denoted p-link, from B1 to B2, noted B1→B2, iff for any pair N1 and N2 of nodes respectively in B1 and B2 such that N1 and N2 are not in $\{E_{null}\}$ and N1 is upward compatible with N2, pushing N1 upward as a parent of N2 in Qtree(AN) does not preserve query semantics equivalence. For example, in the AN of FIG. 3, only two p-links: B5→B3 and B3→B1 are computed.

In the next Lemma, the query tree associated with an AN is considered. That is, a tree that is only composed of (LOJ or FOJ) preserved paths. In this query tree, the properties of $LOJ_{rej}$ operations are explored.

Lemma 4: Let AN be an abstract node computed by the method BUILD COMPACT QUERY PLAN. Let N=$LOJ_{rej}$ be a node of Qtree(AN) such that N has an outer child node N2 and a non outer child node N3. For any node N1 of Qtree(AN) such that N is upward compatible with N1, the following may be observed:

(1) If Required(N1)∩Output(N3)=∅ then pushing N upward as a parent of N1 preserves query semantics equivalence.

(2) If Required(N1)∩Output(N2)=∅ then pushing N upward as a parent of N1 does not preserve query semantics equivalence (3) There are no other cases because if N is upward compatible with N1 then either Required(N1)∩Output(N3)=∅ or Required(N1)∩Output(N2)=∅.

To prove part (1), it is sufficient to prove the property for any N1 that is a parent node of N. Thus, a case analysis on N1 is made.

If N1 is in {F, C, Eval, $FOJ_{rej}$}: by Lemma 1Error! Reference source not found. part (1) and Lemma 2 part (1), pushing N upward as a parent of N1 preserves query semantics equivalence. If N1=LOJ and N is the outer child of N1 then again by Lemma 1 part (1) and Lemma 2 part (1), pushing N upward as a parent of N1 preserves query semantics equivalence. If N1=LOJ and N is the non outer child of N1, then consider the expression: E=N0 LOJ (N2 LOJ$_{rej}$ N3). By assumption of upward compatibility, the condition of the LOJ, noted cond (N1), only involves variables from N0 and N2. Pushing N upward as a parent of N1 would yield (by Error! Reference source not found.) the expression E'=(N0 LOJ N2) LOJ$_{rej}$ N3. The equivalence of E and E' for any database instance I is proved by contradiction.

Assume that any tuple of E in database instance I, noted I[E], is also included in I[E']. Take a tuple $[t_0, t_2, t_3]$ of I[E] where $t_0$ is a tuple of values coming from I[N$_0$], and for i in {2, 3}, t$_i$ is a tuple of values coming from I[R] or a null tuple. The possible cases are: $t_0, t_2, t_3$ are all non null values.

Thus, for a tuple $t_0$, of N0, there exists a matching tuple $[t_2, t_3]$ such that cond(N1) is satisfied by $t_0$, and $t_2$, and cond(N) is satisfied by $t_2$ and $t_3$. Thus, tuple $[t_0, t_2]$ will be also produced by N0 LOJ N2 in E', and will yield a final tuple $[t_0, t_2, t_3]$ in I[E'] through LOJ$_{rej}$ N3 operation.

Suppose that $t_2$ and $t_3$ are null values. This means that there is no matching tuple for $t_0$ in N2. Thus, N0 LOJ N2 will yield a tuple $[t_0,$ null]. Hence, by definition of LOJ$_{rej}$ this tuple cannot match any tuple of N3. Thus, $[t_0,$ null, null] is also in I[E']. Suppose that $t_3$ has a null value. Thus, there is no matching tuple in N3 for $t_2$, and $t_0$ and $t_2$ match cond(N1). Thus, tuple $[t_0, t_2]$ will be produced by N0 LOJ N2 and will not match any tuple of N3. Thus, $[t_0, t_2,$ null] is also in I[E']. The opposite containment between I[E] and I[E'] uses the same arguments as above.

To prove part (2), a case analysis on N1 is made. To begin, it can be noted that if N1 is in {F, C, Eval, FOJ$_{rej}$}: by Error! Reference source not found. part (2) and Error! Reference source not found. part (2), pushing N upward as a parent of N1 does not preserve query semantics equivalence. If N1=LOJ and N is the outer child of N1 then by Lemma 1 part (2) and Lemma 2 part (2), pushing N upward as a parent of N1 preserves query semantics equivalence.

Consider the expression E=N0 LOJ (N2 LOJ$_{rej}$ N3). For any database instance I, assume the existence of a tuple $[t_0, t_2,$ null] of I[E], where t is a tuple of values coming from 1[N,]. Thus, there is no tuple of I[N3] that matches with $t_2$. Pushing N upward as a parent of N1 would yield the expression E'=N2 LOJ$_{rej}$ (N0 LOJ N3). Suppose that tuple $[t_0, t_3]$ is produced by the LOJ. Since there is no tuple of I[N3] that matches with $t_2$, tuple $[t_0, t_2, t_3]$ cannot be in I[E']. In this way, the various parts of Lemma 4 have been proved.

It should be noted that executing the method that operates to construct a CQP from an original query plan as described above computes exactly all the possible p-links within an AN. An associated theorem states that when AN is an abstract node computed by the method that operates to construct a CQP from an original query plan as described above, the following properties hold:
P1: all p-links in AN created by the method are necessary, and
P2: there is no other possible p-link between BE or FOJ blocks of AN.

To prove property P1, a case analysis can be performed based on the diagrams of FIG. 5. Using the definitions developed above with respect to all pairs of nodes N1 and N2, in each case, the definition of a p-link given above is satisfied. To prove property P2, it can be demonstrated that the following p-links are invalid: LOJ→BE, and LOJ→FOJ.

Assume the existence of B1→B2 with B1 an LOJ block and B2 a BE block. Let N be the LOJ node in B1. By the definition of a p-link, N has its parent N1 in B2. By exhibiting cases where N is upward compatible with N1 and pushing N upward as a parent of N1, query semantics equivalence is preserved, which contradicts the assumption. By construction, two cases arise:
Case 1: N belongs to an LOJ preserved path P of Qtree(AN) whose nodes are in B2. Thus, by Lemma 1 part 1, if N is upward compatible with N1, pushing N upward as a parent of N1 preserves query semantics equivalence.
Case 2: N belongs to an LOJ preserved path P of Qtree(AN) whose nodes are not in B2. By definition of LOJ preserved paths, N is the non outer child of N1 in P and N1 is an LOJ$_{null}$. Let N3 be the non outer child of N, then by Lemma 4, if Required(N1)∩Output(N3)=∅, pushing N upward as a parent of N1 preserves query semantics equivalence.

Assume the existence of B1→B2 with B1 an LOJ block and B2 is an FOJ block. The same reasoning used above can be used to exploit the properties of FOJ preserved paths. Thus, properties P1 and P2 are proved, and ***. It should be noted that CQP is built in one top-down traversal of the query tree. Therefore, the complexity is linear in the number of nodes of the query tree.

To execute an Abstract Node, the semantics of p-links should be considered. That is, the p-link designation B1→B2 means that B1 must be computed before B2 can consume the output variables of B1. Therefore, we can derive conditions under which the data carried by the variables can be propagated between blocks.

Let AN be an abstract node, and B1 and B2 be two (expression or FOJ) blocks of AN. The variables of B1 can be propagated to B2 if either (i) there is a p-link B1→B2, or (ii) there exists an LOJ block B3 such that there is a p-link B1→B3, and the preserved variables of B3 can be propagated to B2, or (iii) there exists a block B3 distinct from an LOJ block such that the variables of B1 can be propagated to B3 and the variables of B3 can be propagated to B2. If B is a (expression or FOJ) block then the output variables of B are the union of the set of variables that can be propagated to B and the set of variables created in B (through evaluation nodes).

A valid execution plan AnP for an abstract node is a tree whose nodes are either block expressions or FOJ blocks. If all LOJ blocks are attached to a (expression of FOJ) block that provides all the preserved variables of the LOJ, AnP is defined as follows:
Leaf node: a (expression or FOJ) block is a leaf node of a query plan AnP if all its (used) variables are contained in its variable nodes.
Intermediate node: a (expression or FOJ) block B is a parent node of B1, . . . , Bp if all its (used) variables are contained either in its variable nodes or in the set of output of B1, . . . , Bp.

For example, in the abstract node AN associated with the query plan of FIG. 4, the only leaf node is B5. Then B1 and B3 are intermediate nodes. Blocks B2 and B4 can be either attached to B1 or B3.

In the following discussion, two techniques that can be used to provide a query plan with a relatively small data processing set are presented, the first creates maximal source sub-queries, and the second implements semi-join reductions.

After simplification and push-down transformations whereby singleton nodes of a CQP have been pushed down, another stage may follow. This stage involves the construction of maximal source sub-queries.

One feature that assists in the construction of maximal sub-queries is the capability model of the data sources. The model distinguishes between two types of capabilities: (1)

SQL-based capabilities, which indicate the SQL operations supported by the data source independently from the tables and columns to which the operations apply, and (2) metadata-based capabilities, which overwrite an SQL capability depending on the tables and columns to which the operations are applied. This is because SQL-based capabilities describe the evaluations (functional expressions) that can be computed by a data source.

A variable dependency graph (DAG) has variable nodes or operation nodes and arcs that represent the migration of the variables starting from the variable nodes towards the operation nodes. Arcs between operation nodes are possible due to the creation of variables by an Eval operation. The dependency graph represents the free ordering between operations given by the property of upward compatible operations and Lemma 3.

Figure 6:
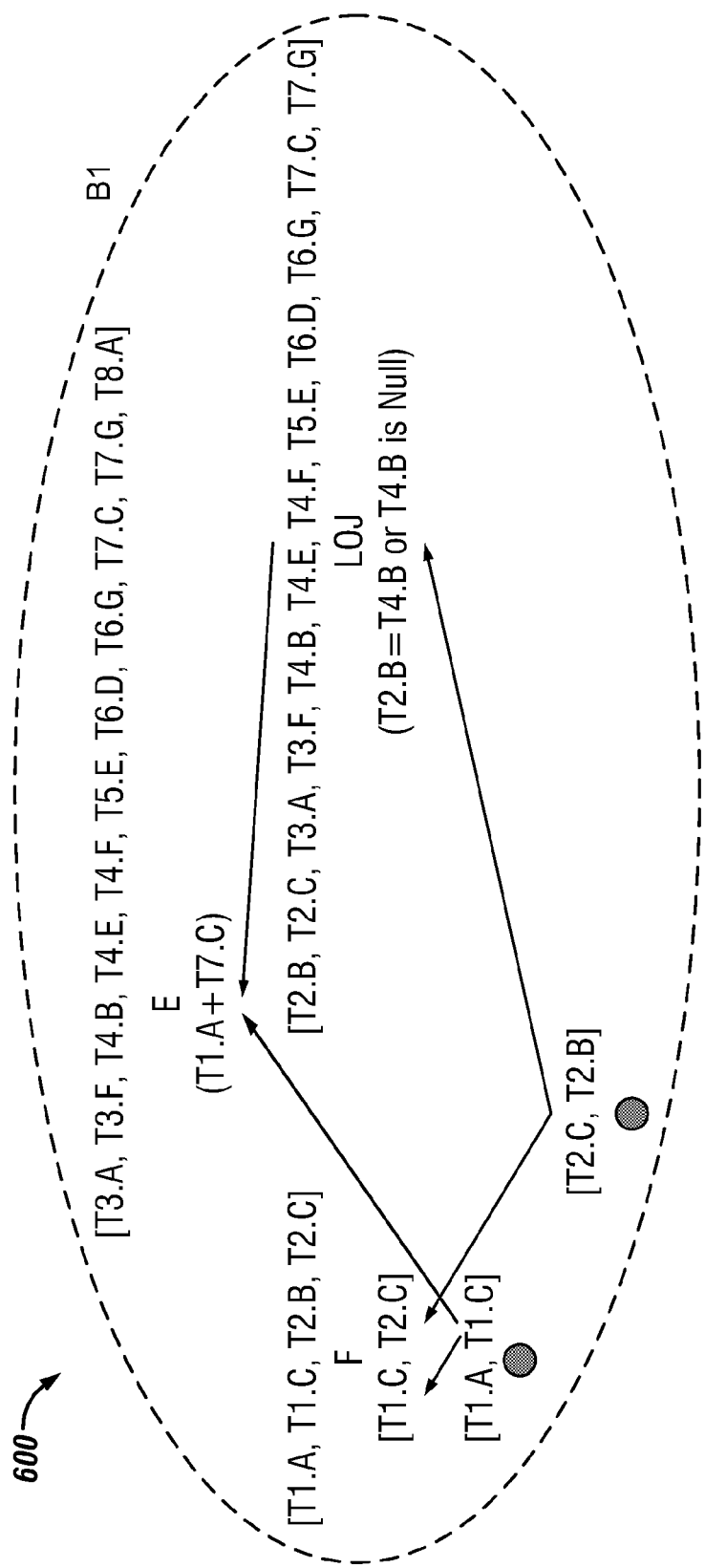
FIG. 6 illustrates a block with a dependency graph and variable nodes, according to various embodiments of the invention.

FIG. 6 illustrates a block with a dependency graph 600 and variable nodes, according to various embodiments of the invention. In this case, the graph 600 represents the details of block B1 from FIG. 4. It can be assumed that all the variables occurring in the query plan are projected out in the result of the query. The filled circles represent variable nodes associated with the block that are inherited from the single LOJ preserved path contained by B1. In this figure, the variables (between square brackets) that are provided by an operation node are shown. Note that the variables required by the Eval operation E (from T7) and the LOJnull operation (from T4) are not represented as variables nodes of B1.

An embodiment of a method to determine maximal sub-queries in a CQP is now presented. Here it is assumed that there are as many designations as there are data sources, plus two special designations NONE and UNKNOWN. The designations (e.g., different colors) can be used to mark the nodes of the CQP. Initially, all source nodes are designated according to their sources.

A source sub-query (SQ) is analogous to an abstract node. Thus, the SQ may include a set of blocks (expression, FOJ, LOJ), and a set of p-links. To determine a maximal sub-query, the CQP is used as input, and the output is a derivative query plan (e.g., a new CQP) in which abstract nodes and source nodes have been modified In some embodiments, the method to determine maximal source sub-queries begins at the source nodes of a CQP (which comprise scans of source tables), and a bottom-up, left to right traversal of the CQP is performed.

In the first case, if a singleton node N is encountered, then:
1. If (i) its input nodes in the CQP all have a color C distinct from NONE, (ii) N satisfies the source capabilities of source C, and (iii) it is profitable to push N into C, then the tree rooted at N is moved to a source node of color C and the parent of N is examined. Profit here is measured in terms of search economy, in terms of time to execute the search and/or memory space used to execute the search. The profitability condition can be a heuristic that considers multiple cases, such as for a union singleton node, which is not always worth pushing.
2. Otherwise, mark N with a color associated with NONE and stop tree traversal from N.

In the second case, if an abstract node N is encountered then search for the maximal source sub-queries that can be extracted from N, such as SQ1, . . . , SQn. This is accomplished by:
1. if there is a single SQ1 of color C that is equivalent to N then the tree rooted at N is moved to a new source node of color C and the parent of N is examined.
2. otherwise, create n source nodes for the SQi sub-queries, remove them from N, and merge them with the sub-queries associated with the source nodes input of N. Finally, mark N with a color associated with NONE and stop tree traversal from N.

Maximal sub-queries can also be located within an abstract node. In this case, the input is an abstract node AN, and the output is a set of source sub-queries other than table scans, and possibly a new node AN' where sub-queries have been removed from the expression or FOJ blocks, empty blocks are removed, and LOJ blocks have also been removed.

In the first part of the method to locate maximal sub-queries, an initialization sequence may occur. Thus, for each (expression or FOJ) block that qualifies as a leaf node in a valid query plan, search for maximal sub-queries SQ1, . . . , SQn. Using the same analysis as in the second case of the method to determine maximal source sub-queries, either a block of color C with a single associated sub-query is identified, or a block of color NONE with several associated sub-queries is identified. The output p-link of a block takes the same color as its block.

The second part of the method to locate maximal sub-queries involves a bottom-up traversal of p-links and marking of all nodes. Here one may begin from colored blocks and perform a bottom-up traversal of the graph of p-links until all blocks are either marked as NONE or UNKNOWN.

In the first case of this second part, B is an expression or FOJ colored block, its color is neither NONE nor UNKNOWN, and there is a link B→B'. Then, let SQ be the sub-query including B, and C its color, wherein Pro_B' is the set of propagated variables of B'. Then the variables of Prop_B' occurring in the output variables of SQ take the color C.

Search for the maximal sub-queries SQ1, . . . , SQn of B' by noting that if there is a single SQ1 of color C that is equivalent to B', then SQ1 is merged with the sub-queries associated with the blocks that point to B', and B' is marked with color C. Otherwise, if all the variables of B' are colored, the SQi sub-queries are merged with the sub-queries associated with the blocks that point to B', and B' is marked with color NONE. If not, B' is marked as UNKNOWN.

In the second case of the second part, B is a colored block, and there is a link B→B' where B' is an LOJ block. Then a search is conducted for a sub-query SQ of color C that contains all the variable on the outer join side of the LOJ. If SQ is found in a block B", it is merged with the LOJ and the sub-query associated with its input block. Block B' is removed from AN. If there is a block that has an input p-link from B" and a color UNKNOWN, check to see if it matches the first case of this second part.

In the third case of the second part, B is an LOJ block with no incoming p-link. This is resolved in a fashion similar to the second case.

The third part of the method to locate maximal sub-queries involves cleaning up abstract nodes. This includes:
1. first handling the blocks having an a color associated with UNKNOWN. Each colored sub-query SQ' of such a block, say B, is merged with the corresponding sub-query, (say SQ) which is associated with the block which points to B. That is, SQ and SQ' have the same color, and all the propagated variables used in SQ' are output variables of SQ
2. second removing sub-queries from their associated blocks and removing empty blocks.

To find maximal sub-queries in a block, a block B with colored variables in variable nodes and propagated variables can be used as input to a method embodiment. The output may comprise a set of source sub-queries other than table scans, and possibly a new block B' where sub-queries have been removed from B. In this case, one may traverse in a bottom-up manner the DAG of the block.

At each node of this graph, if (i) its input variables have the same color C distinct from NONE, (ii) the node expression is compatible with the capabilities of C, and (iii) it is profitable to push the node expression into C, then the node is marked with the color of C. Otherwise, variable equivalences are used to find a set of input variables that match condition (i). At the end of this embodiment of a method, all nodes of a same color C form a sub-query (containing a sub-block) for source C and all sub-queries other than single table scans are returned.

The profitability condition of item (iii) in this method can be determined as noted previously with respect to other methods. It may comprise a heuristic that is directed to conditions where, for example, if two sub-queries SQ1 and SQ2 of color C can be composed via a node into a sub-query SQ of color C, then dps(SQ) dps(SQ1)+dps(SQ2).

The complexity of the search of the maximal sub-queries is generally linear in the number of nodes of a CQP, the number of blocks in an abstract node, and the number of nodes in the DAG of a block. In the worst case, the time complexity is on the order of O(n), where n is the number of the nodes of the original query tree (since each node of a DAG corresponds to a node of a query tree). The space complexity is on the order of O(p), where p is the number of leaves of the original query tree.

Figure 7:
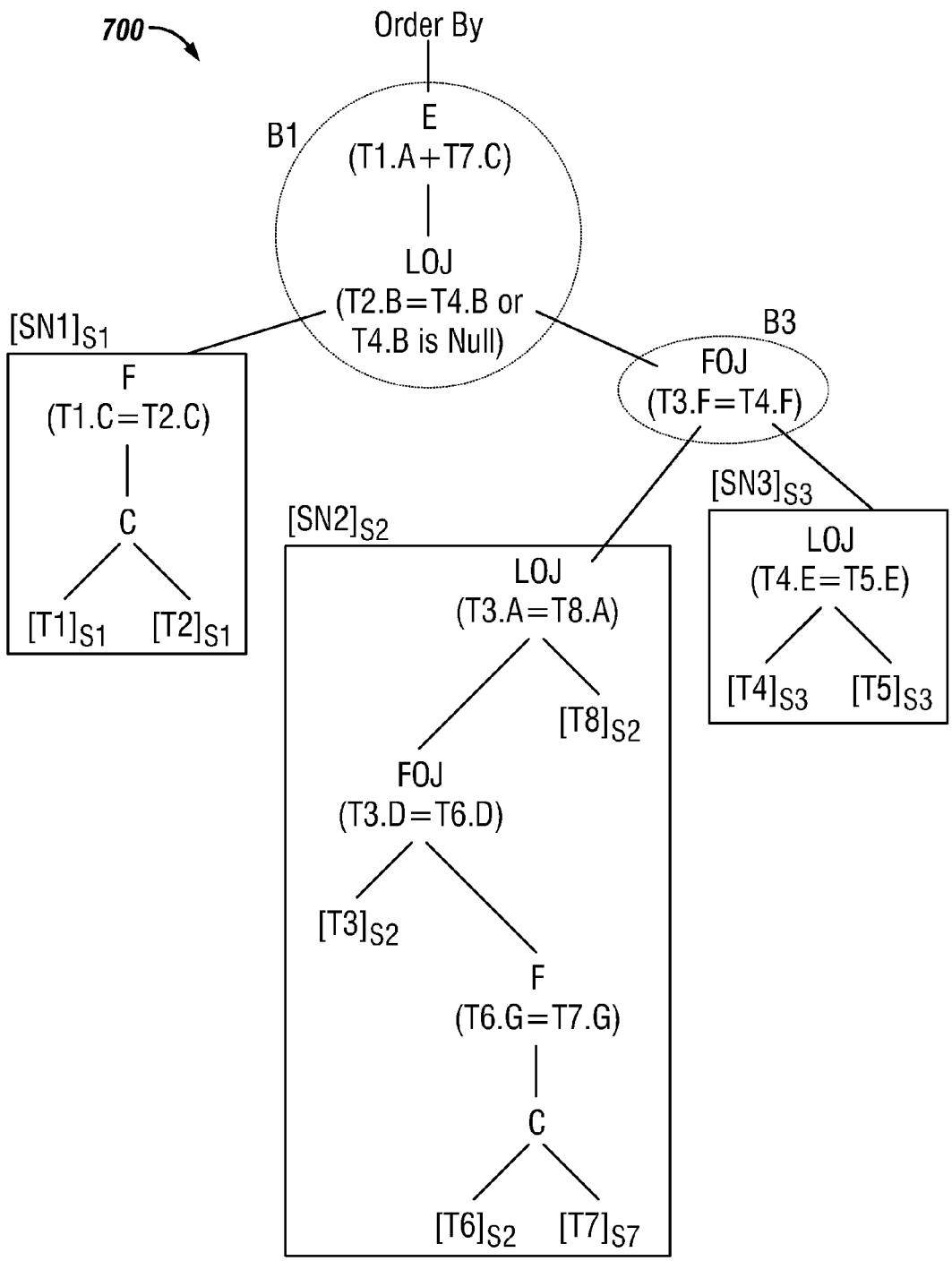
FIG. 7 illustrates maximal sub-queries within a CQP, according to various embodiments of the invention.

FIG. 7 illustrates maximal sub-queries 700 within a CQP, according to various embodiments of the invention. Here, the method embodiment of locating maximal sub-queries within an abstract node is applied to abstract nodes AN={B1, B2, B3, B4, B5}.

First, it can be noted that B5 is the only leaf node. When the method of finding maximal sub-queries in a block is applied, the result is [SQ0]S2={F(T6 C T7)}. Thus, B5 takes the color COLOR.

Second, the first case of part 2 of the method embodiment of locating maximal sub-queries in an abstract node applies to B3, so SQ1 appears as table scan of T4 [SQ1]S3={T4} and SQ0 is merged with T3 to get [SQ2]S2={T3 FOJ F(T6 C T7)}. B3 is marked to NONE. The second case of part 2 of the method embodiment of locating maximal sub-queries in an abstract node applies to B1 and the search for maximal sub-queries returns [SQ3]S1={F(T1 C T2))} and B1 is marked to UNKNOWN. The second case of part 2 of the method embodiment of locating maximal sub-queries in an abstract node also applies to B4, so SQ1 is merged with the LOJ to create [SQ4]S3={T4 LOJ T5} which is part of block B3, and B4 is removed. Since B3→B1 and B1 is UNKNOWN it is examined but remains unchanged. Then it can be noted that The second case of part 2 of the method embodiment of locating maximal sub-queries in an abstract node 2 applies to B2, so that SQ2 is merged with the LOJ to create [SQ5]S2={(T3 FOJ F(T6 C T7)) LOJ T8} which is part of B3, and B2 is removed. Again, since B3→B1 and B1 is UNKNOWN, B1 is examined and is moved to NONE since it has all its variables.

Third, B3 is transformed into {T3 FOJ T4}, B1 is transformed into {E(T2 LOJ T4)}. Thus, the method embodiment of locating maximal sub-queries in an abstract node returns AN'={B1, B3} with three sub-queries. Finally, the method to determine maximal sub-queries in a CQP is applied, creating three source nodes: SN1 is the result of the merge of T2, T1, and [SQ3]S1; SN2 is the result of the merge of T3, T6, T7, [SQ2]S2, and [SQ5]S2; and SN3 is the result of the merge of T4, T5, and [SQ4]S3. This result is illustrated in FIG. 7.

Semi-join reduction is a method to reduce communication costs while executing joins in a distributed system. In some embodiments, this method can be applied to a CQP.

Suppose that two sub-queries SQ1 and SQ2 from two distinct sources are to be joined with a join predicate SQ1.A=SQ2.A. The semi-join reduction uses SQ1.A to generate a new sub-query: SQ2': SQ1.A SemiJoin (A=A) SQ2. Then SQ1 will be joined with SQ2' to produce the final result.

The effectiveness of this semi-join reduction depends on the number of distinct A values that will be returned by SQ1 and the number of records returned by each SQ2$ query as compared to the number of records returned by SQ2 (i.e., the cardinality of the result of SQ2). Thus, the decision to use a semi-join reducer depends on statistics that in turn depend on distinct values, and the ability to estimate the fan-out factor between SQ1.A and SQ2.A.

Bind join operations can be used as a mechanism to implement semi-join reduction. Reusing the previous example, a possible Bind Join implementation of SQ2' is to: collect distinct join attribute values from SQ1 (A values) into a cache node, create a parameterized query SQ2$ which adds a filter A=$A, and then to generate as many executions of SQ2$ as there are A values in the cache by substituting the parameter $A with a value from the cache.

Figure 8:
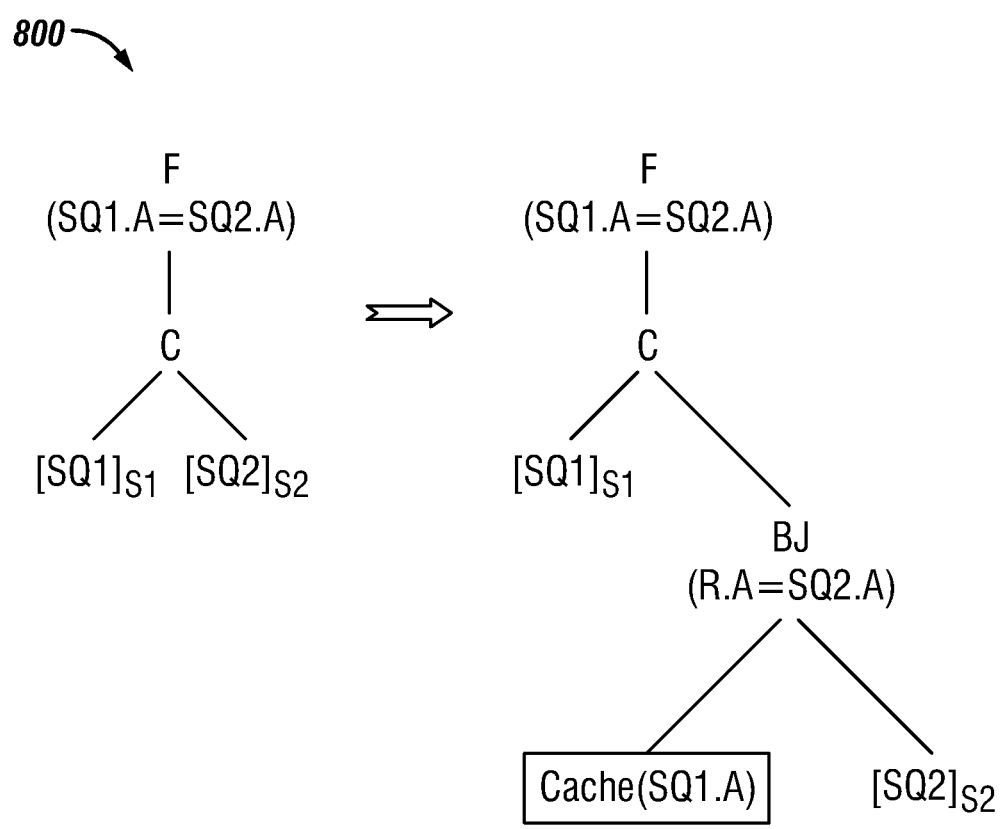
FIG. 8 illustrates a semi-join reduction using a bind join operation, according to various embodiments of the invention.

FIG. 8 illustrates a semi-join reduction 800 using a bind join operation, according to various embodiments of the invention. R denotes the left operand of the bind join operator (noted BJ). The result of SQ1.A is a semi-join reducer for sub-query SQ2. The use of a cache containing the set of distinct join attribute values is sometimes referred to as "sideways information passing" (SIP), that is, information that is passed across operators in a way that is orthogonal to the tree structure of the CQP. Therefore, semi-join reduction techniques are also referred to as compile-time SIP strategies.

Multiple versions of a Bind Join operator can be implemented to handle multiple cases of semi-join reductions. In particular, a Hybrid Bind Join is an implementation that adapts its behavior (hash join or bind join) depending on the size of the distinct values of the cache node. This implementation provides limited adaptive query processing in the sense that it enables the decision of using a semi-join reducer to be changed if the statistics collected at run-time show that the semi-join is not profitable.

Given a CQP, it is often useful to find good semi-join reducers for each large sub-query, that is, semi-join reducers that can significantly limit the number of rows returned by each large sub-query. Thus, derivative query plans where semi-join reducers are used for reducing source nodes of a CQP may provide processing advantages, even if intermediate results are not reduced.

The notion of variable reducer will now be introduced. Let V1 and V2 be two variables of a CQP. Then V1 is said to be a reducer for V2 if there exists a filter with a disjunctive term of the form V1=V2, or if there exists an LOJ whose condition has a disjunctive term of the form V1=V2, and V2 is a variable on the non-outer side of the LOJ. The Reducer Set for a variable V1 contains all the variables for which V1 can be a reducer. If V2 is in this set, we say that V2 is reducible by V1. In the example of FIG. 8, variable SQ1.A is a reducer for variable SQ2.A, and conversely. Thus, Reducer Set for variable SQ1.A contains SQ2.A.

For every variable of the CQP, it may be useful to know the source variables—i.e., the output variables of a source sub-query—that the variable can reduce through equality filtering conditions. Conversely, it would then be known which of the source variables can act as reducers.

Reductions can happen transitively through multiple equality conditions. Thus, the following method embodiment operates to traverse a CQP in a top-down fashion in order to compute all the variables that can be reduced (transitively) by any given variable. To determine sets of variable reducers, a CQP with a Variable Set containing the output variables of the CQP can be used as input. The output may comprise a Variable Set containing all the variables of CQP, and for each variable V, a Reducer Set that contains all the variables reducible by V. Here, a top down, depth first traversal of the CQP is performed. Prior to application of the method embodiment, the Variable Set contains all output variables of the CQP and each variable has an empty Reducer Set.

In the first case, if N is a union operator then let V' be a variable in the Variable Set such that there exists a variable V produced by an input node of N and V has been renamed as V'. If there exists a variable W in Variable Set such that V' is in the Reducer Set of W then V is added to the Reducer Set of W.

In the second case, if N is an aggregate and V is a group by variable of the Variable Set, then the input variable of N corresponding to V inherits the Reducer Set of V.

In the third case, if an abstract node AN is encountered, then:
- If B is a block expression of AN and V is a variable in the Variable Set output of B, each variable V' that is a reducer for V is added to the Reducer Set of V together with its reducers, V' is added to the Variable Set (if it does not exist), and the reducers of V are added to its Reducer Set.
- If B is an LOJ block expression of AN and V is a variable in B, then V is added to the Variable Set (if it does not exist) and for each variable V' that is a reducer for V, V is (i) added to the reducer set of V' together with the reducers of V, and (ii) transitively added to the reducer set of each variable having V' in its reducer set until the propagation completes.
- If B is a block expression of AN and V is a variable of B that is not in the Variable Set output of B, then V is added to the Variable Set (if it does not exist) and each variable V' that is a reducer for V is added to its Reducer Set together with the reducers of V'.
- If B is an FOJ block, nothing happens and traversal continues.

In the fourth case, if an FOJnull node is encountered, nothing happens and traversal continues. In the fifth case, if a source node is encountered, nothing happens.

The time complexity of this method embodiment is on the order of O(n), where n is the number of nodes in the original query tree. In some embodiments, this computation can be done at the same time as the CQP is built from the original query plan.

In some embodiments, it is known (e.g., estimated) whether the number of records produced by the node is either "small", "big" or "unknown" with respect to each node of a CQP. Additional notations will be introduced.

Each node N of a CQP can be associated with an annotation comprising two sets: a Small Variable Set (SVS) and a Big Variable Set (BVS). The set SVS contains vectors of the form S[x1, . . . , xk], such that (i) S is an input node of N, and x1, . . . , xk are output variables of S, and (ii) the number of records produced by S is small. Similarly BVS is defined as the set of vectors for input nodes of N that are expected to be big.

A reduction path associated with an abstract node is defined as a path of nodes in a CQP where, if N precedes N' in the path, then N is a reducer for N'. Reduction paths are computed in the method embodiment below, and are used to generate the cache nodes of Bind Joins.

With these concepts in place, a more general method to find semi-join reducers in a CQP can be presented. For the sake of clarity, the following is a simplified version of additional methods that might actually be implemented in real-world situations. The worst case polynomial complexity of the presented method is on the order of $O(n^p)$, where n is the number of source nodes and p is the height of the CQP query tree.

The method embodiment to determine semi-join reducers may begin at a source node that is known to have a small result set and whose variables can reduce other source variables. By navigating upward in the CQP, an expression can be built that can operate as a semi-join reducer for a source sub-query. In turn, this reduced source sub-query can be used to form other semi-join reducers.

Thus, a method embodiment that can be used to build semi-join reductions may take a CQP with its Variable Set and Reducer Set for each variable as input. The output may comprise a CQP in which all semi-join reducers for a source sub-query have been detected and integrated into abstract nodes.

In the first part of the method, the annotations SVS and BVS are built for every source node of the CQP, and a source node (InitNode) is selected that has a relatively small dps and whose output variables have at least a non empty Reducer Set.

In the second part of the method, a bottom-up, left to right traversal of the CQP is performed, starting from InitNode, until no new node can be visited.

In the first case of the second part, if a singleton node N is encountered:
- if N is in {A, U, M, O}, the annotation and the vector for node N are computed in a straightforward manner and classified.
- If N is an FOJnull node, then the traversal is halted and another InitNode (if any) is selected.

In the second case of the second part, if an abstract node AN is encountered:
- Build (or update) the annotations for AN.
- For each new vector S[x1, . . . , xk] of SVS(AN), find the vectors of BVS(AN) that are reducible from S[x1, . . . , xk], henceforth called "big reducible".
- For each big reducible vector N' found that is a source node and can be reduced by a vector N to become small, move N' from BVS(AN) to SVS(AN), add (N, N') to the reduction path of AN ending at N (if any), and build a Bind Join for N' using reduction path from N to N'.
- If a new vector has been added to SVS(AN) then repeat until no new vector is found in SVS(AN): find the big reducible of each new vector of SVS(AN), and apply the actions of moving N' from BVS(AN) to SVS(AN), adding (N, N') to the reduction path of AN ending at N (if any), and building Bind Join for N' using reduction path from N to N', as noted previously.
- For each big reducible N' is not a source node and for each variable v of N' that is reduced by a variable of a vector N, find the source nodes SN such that SN is big and v is an output variable of SN modulo variable renaming. If a (single) SN node is found without renaming, and if the vector of SN is classified as small after reduction, then update the annotation of SN and apply the second part of the method from SN as an InitNode until node AN is encountered else return.
- If multiple SN nodes are found modulo renaming, then perform a bottom up traversal of the CQP starting from all found SN nodes similarly to the second part of the method, except that a union node blocks the bottom up traversal until all its child nodes' vectors have been updated with respect to the SN nodes found.
- To continue, for each big reducible N' is not a source node and for each variable v of N' that is reduced by a variable of a vector N, update the annotation of AN. Then, add (N, SN) to the reduction path of AN ending at N, and build a Bind Join for SN using the reduction path from N to SN.

If a new vector has been added to SVS(AN) then find the big reducible of the new vector of SVS(AN), and apply the second case of the second part, without building/updating the annotations for AN, or finding the reducible vectors of BVS(AN).

Finally, compute the vector for AN and classify it as big or small.

Other embodiments may be implemented, in addition to what has previously been described, or separately. For example, to find a big reducible, the vector S[x1, ..., xk], and a set BVS(N) can be used as input. The output may comprise all vectors of BVS that are reducible from S[x1, ..., xk], represented in a (big reducible) graph where nodes are vectors and there is an arc from N to N' if N is a reducer for N'.

In this method embodiment, for each variable x1 of S[x1, ..., xk], a search can be conducted to determine whether a variable y exists in the Reducer Set of x1 such that y belongs to a vector N'[..., y, ...] of BVS. If found, then add the vector N' to the output graph and create an arc from S to N'.

To build an annotation source node, a source node SN associated with a sub-query SQ can be taken as input. The output may comprise the annotations of SVS and BVS for SN. In this case, heuristics and statistics can be used to identify if SQ is expected to return a small or large data processing set. If SQ is expected to be small, then all its output variables are in a vector SN of SVS—otherwise they are in BVS.

To build a Bind Join, a reduction path from N to N', with a source node N' can be taken as input. The output may comprise an updated source node of N' which contains a Bind Join between a cache node and N'.

In this case, the maximal sub-query covering the nodes of the input reduction path is built, using the DAG, and taking only the equality predicates that involve variables of N'. This sub-query is then projected on the columns that are used in equality predicates with N' with a DISTINCT clause. The sub-query is used to compute the cache node associated with N'. Finally, the source node N' is rewritten into a bind join between SQ and the cache node.

Figure 9:
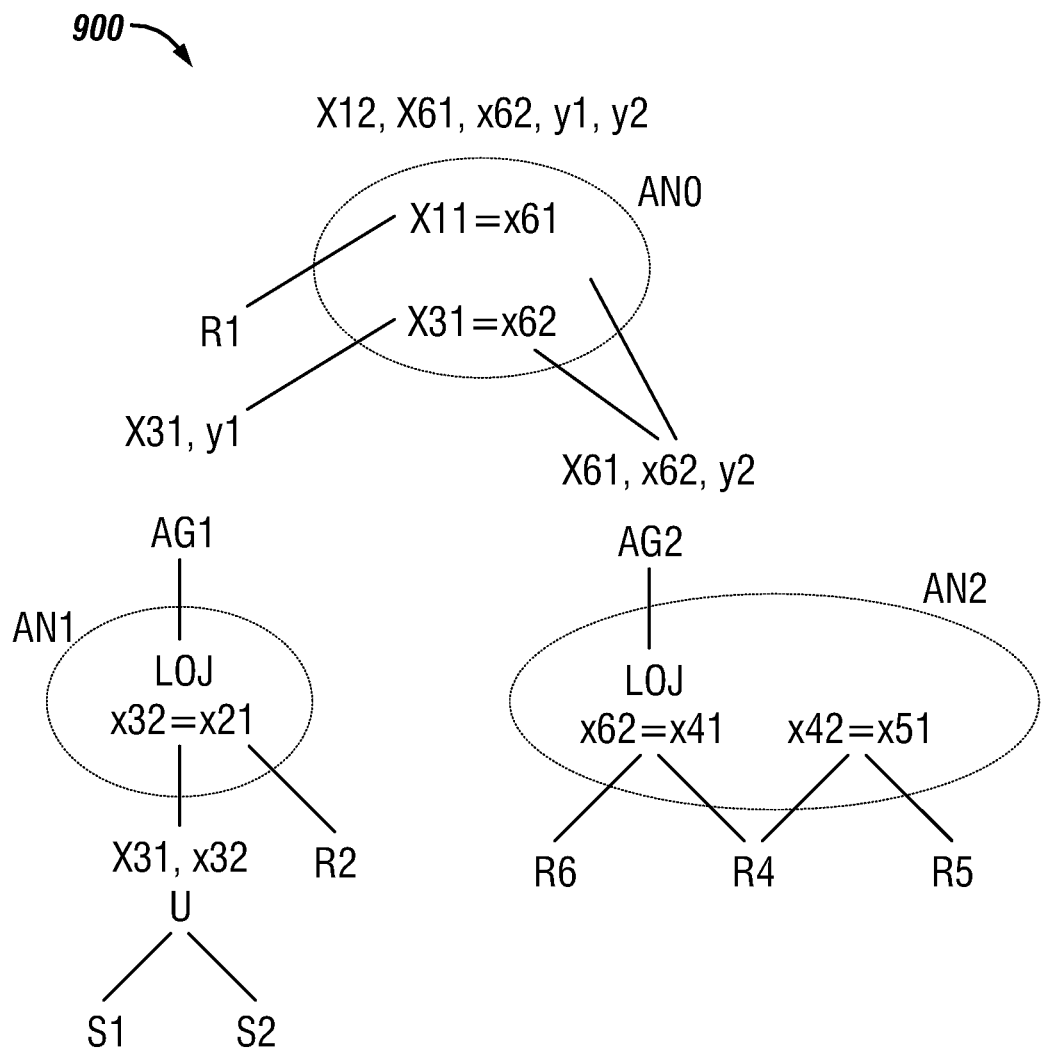
FIG. 9 illustrates building semi-join reductions within a CQP, according to various embodiments of the invention.

FIG. 9 illustrates building semi-join reductions 900 within a CQP, according to various embodiments of the invention. Consider the CQP of FIG. 4. All source nodes have pairwise distinct data sources. Abstract nodes are represented using dotted lines. It is assumed that S1, R1, and R4 are estimated to be small source nodes, and all the others are expected to be big. Output variables are indicated on top of each node. FIG. 9 shows a sketch of a method embodiment of building semi-join reductions on a CQP.

In the first part of the method, R4 is addressed. It is seen that S1, R1, and R4 have an empty BVS and their SVS is as follows: SVS(S1)={S1[x'31, x'32]}, SVS(R1)={R1[x11, x12]}, SVS(R4)={R4[x41, x42]}. Assume InitNode is R4.

In the second part of the method, AN2 is encountered. SVS(AN2)={R4[x41, x42]}, and BVS(AN2)={R5[x51], R6[x61, x62]}. R5[x51] is the single vector of BVS that is reducible from R4[x41, x42] because x51 belongs to the Reducer Set of x42. The second case of the method embodiment to build semi-join reductions is implemented, and assuming that the result of the join between R4 and R5 is small, then R5 is moved from BVS to SVS, a reduction path (R4, R5) is created, and a Bind Join is created in the source node R5. Finally, the vector for AN2 is determined to be AN2[x41, x42, x51, x61, x62], and it is expected to be big.

To continue, AG2 is encountered. Its vector is AG2[x61, x62, y2] and big. Then AN0 is encountered. SVS(AN0)={R1[x11, x12]}, and BVS(AN0)={AG1[x31, y1], AG2[x61, x62, y2]}. By the second case of the method embodiment to build semi-join reductions, AG2 is the only vector of BVS that is reducible from R1. In addition, v=x61 is the only variable of AG2 that is reduced by variable x11 of R1. The big source node with output variable x61 is R6 and assuming that R6 becomes small by reduction x11=x61. The method embodiment to build semi-join reductions is then applied from R6 up to AN0.

Now R6 is addressed. First, AN2 is encountered. SVS(AN2)={R4[x41, x42], R5[x51], R6[x61, x62]}, and BVS(AN2)={ }. Assuming that the result of the LOJ x62=x41 is small, then vector AN2[x41, x42, x51, x61, x62] is small.

Then, AG2 is encountered. Its vector is AG2[x61, x62, y2] and small. And this finishes the traversal from R2.

R4 is again addressed. The annotation is updated: SVS(AN0)={R1[x11, x12], AG2[x61, x62, y2]}, and BVS(AN0)={AG1[x31, y1]}. (R1, R6) is added to the reduction path from R1 and a Bind Join is created in the source node for R6. The second case of the method embodiment to build semi-join reductions is implemented, and AG1 is found as a big reducible from the new addition AG2 in SVS(AN0) via variable x62. Since AG1 is not a source node, two source nodes S1 and S2 can be found which, after renaming via the union, have x31 as output variable but only S2 is big. Thus, S2 now provides a mechanism to build semi-join reductions.

First, a union node is encountered. It is a blocking node. Since all child node vectors have been updated, vector U[x31, x32] is computed and is small.

Then, AN1 is encountered. SVS(AN1)={U[x31, x32]} and BVS(AN0)={R2[x21, x22]}. The second case of the method embodiment to build semi-join reductions is implemented, and R2 is reducible from U via x32. Since it is a source node, and assuming that R2 becomes small after the reduction by U, then R2[x21, x22] is moved to SVS, a reduction path (U, R2) is added in AN1, and a Bind Join is created in the source node for R2.

Now AG1 is encountered. Its vector is small. This finishes the traversal from S2.

R4 is once again addressed. The annotation is updated: SVS(AN0)={R1[x11, x12], AG2[x61, x62, y2], AG1[x31, y1]}, and BVS(AN0)={ }. A reduction path (AG2, S2) is added in AN0 and a Bind Join is created in the source node for S2. No new results arise from implementing the second case of the method embodiment to build semi-join reductions.

All nodes of the CQP have been processed, so the method embodiment terminates. In summary, all data sources have been reduced by semi-join and the following four Bind Joins have been created: (AG2 BJ S2); (U BJ R2); (R1 BJ R6); (R4 BJ R5).

In some embodiments, additional options exist. For example, assume there exists a new source node R7 that is big and is an input of AN2 with a predicate x52=x71. Then the reduction path of AN2 (R4, R5) will be extended into (R4, R5, R7) and would be used to compute a Bind Join on R7. Next, assume that R7 is small, then there would be another reduction path (R7, R5) in addition to (R4, R5) and these two paths could be used to build the Bind Join for R5 by building a cache node that contains the Cartesian product of the distinct values of x41 and x71. Finally, assume that the result of the reduction of S2 is uncertain (captured by a value "unknown" on the size of S2 after reduction), if R2 is known to be big it may be useful to create a Hybrid Bind Join for R2. Thus, many embodiments may be realized.

Figure 10:
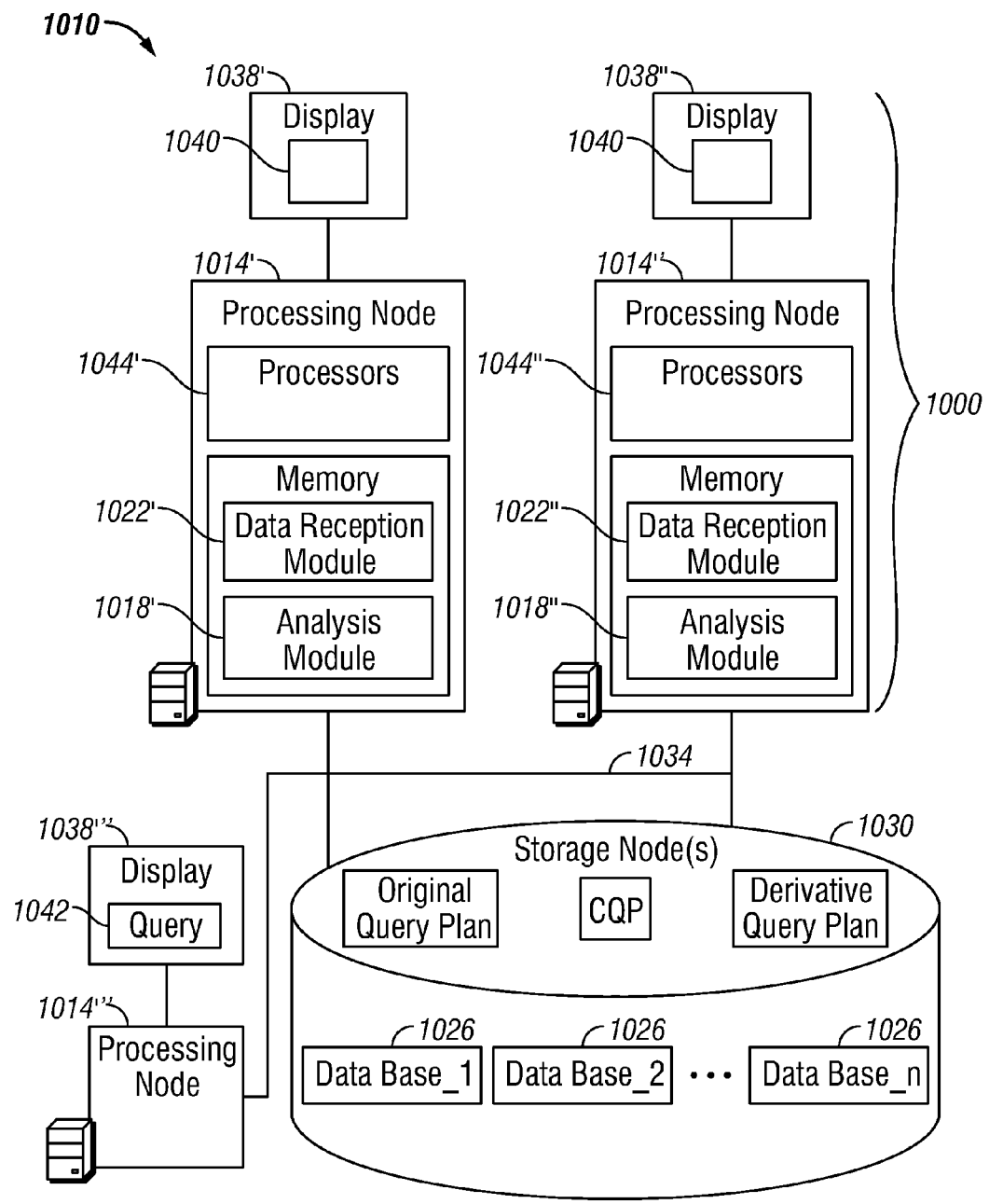
FIG. 10 is a block diagram of apparatus and systems, according to various embodiments of the invention.

For example, FIG. 10 is a block diagram of apparatus 1000 and system 1010 according to various embodiments of the invention. Given the information discussed previously, it can be seen that in some embodiments, an apparatus 1000 to reformulate query plans comprises a processing node 1014 comprising a data reception module 1022 to receive an original query plan comprising query nodes that include one or more database operations.

In many embodiments, the apparatus 1000 also comprises an analysis module 1018 to couple to the processing node 1014. The analysis module 1018 can be used to transform the original query plan into an equivalent executable CQP to store on a machine readable device (e.g., the storage nodes 1030, and/or the memory in the processing node 1014). The CQP may be stored in one or more databases 1026.

The CQP comprises two or more source nodes including scan operations to source tables. The source nodes are coupled to at least one abstract node and at least one singleton node. Children of the abstract node may comprise at least one of the source nodes or the at least one singleton node, but not another abstract node.

The singleton nodes comprise a single operation selected from aggregate, union, order by, or null accepting FOJ. The abstract nodes comprise a set of operations selected from at least one of cartesian product, evaluation, filter, LOJ, or null rejecting FOJ, and are partitioned into multiple intra-partition commutable operations that can be executed in a different order from the original query plan based on upward compatibility, or a combination of a single null rejecting LOJ operation and the multiple intra-partition commutable operations.

The apparatus 1000 may comprise one or more desktop computers, for example, clients, servers, or even multiple processing nodes 1014 that operate to receive the original query plan, and then to process the original query plan.

In some embodiments, the apparatus 1000 includes a display 1038 to display output from the apparatus 1000 to an end-user. Thus, in some embodiments, the apparatus 1000 comprises a display 1038 to display a search result 1040 provided by executing the CQP or a derivative query plan derived from the CQP. For example, a derivative query plan may be provided by computing maximal source sub-queries and semi-join reductions on the CQP. The display 1038 may also be used to display at least a portion of a database query 1040 that is processed to provide the original query plan.

Multiple processors may be used within the apparatus to divide up the processing tasks. Thus, in some embodiments the apparatus 1000 comprises multiple processors 1044, wherein the one processing node 1014' comprises a first one of the multiple processors 1044', and wherein the analysis module 1018" comprises a software module to be executed by a second one of the multiple processors 1044".

The transformation of the original query plan into a CQP and/or a derivative query plan may be performed by a server, or a client. Thus, the processing nodes 1014 may comprise servers and/or clients. Additional embodiments may be realized.

For example, a system 1010 may comprise multiple processing nodes 1014, including more than one of the apparatus 1000, and perhaps a storage node 1030. The various nodes may be coupled over one or more networks 1034. Thus, a system 1010 may comprise one or more storage nodes 1030 to store at least one of a plurality of databases 1026. The system 1010 may also comprise a first processing node 1014' comprising a data reception module 1022' to receive at least a portion of an original query plan comprising query nodes that include one or more database operations to be conducted on the plurality of databases. The system 1010 may also comprise a second processing node 1014" including an analysis module 1018" to couple to the first processing node 1014', the analysis module 1018" to transform the original query plan into an equivalent executable CQP to store on a machine readable device (e.g., the storage nodes 1030, the memory in one of the processing nodes 1014, or elsewhere). The CQP may be structured according to the description given with respect to the apparatus 1000 previously.

In some embodiments, multiple storage nodes 1030 may be used to store multiple databases 1026 that are processed as a result of executing the CQP, or a derivative of the CQP. Thus, the plurality of databases 1026 may be stored on one or more of a plurality of storage nodes 1030.

The system 1010 may include one or more displays to enter and/or display database queries, the original query plan, the CQP, a derivative of the CQP, and/or the results of executing the CQP or the derivative of the CQP. Thus, in some embodiments, the system 1010 further comprises a display 1038''' coupled to a third processing node 1014''' to display at least a portion of a database query 1042 that is processed to provide the original query plan, the CQP, and/or a derivative of the CQP.

The nodes of the system 1010 may comprise physical nodes, virtual machines, and combinations of these. The system 1010 may include multiple servers and clients. Thus, the first processing node 1014' may comprise a client node, and the second processing node 1014" may comprise a server node, and vice versa. Still further embodiments may be realized.

Figure 11:
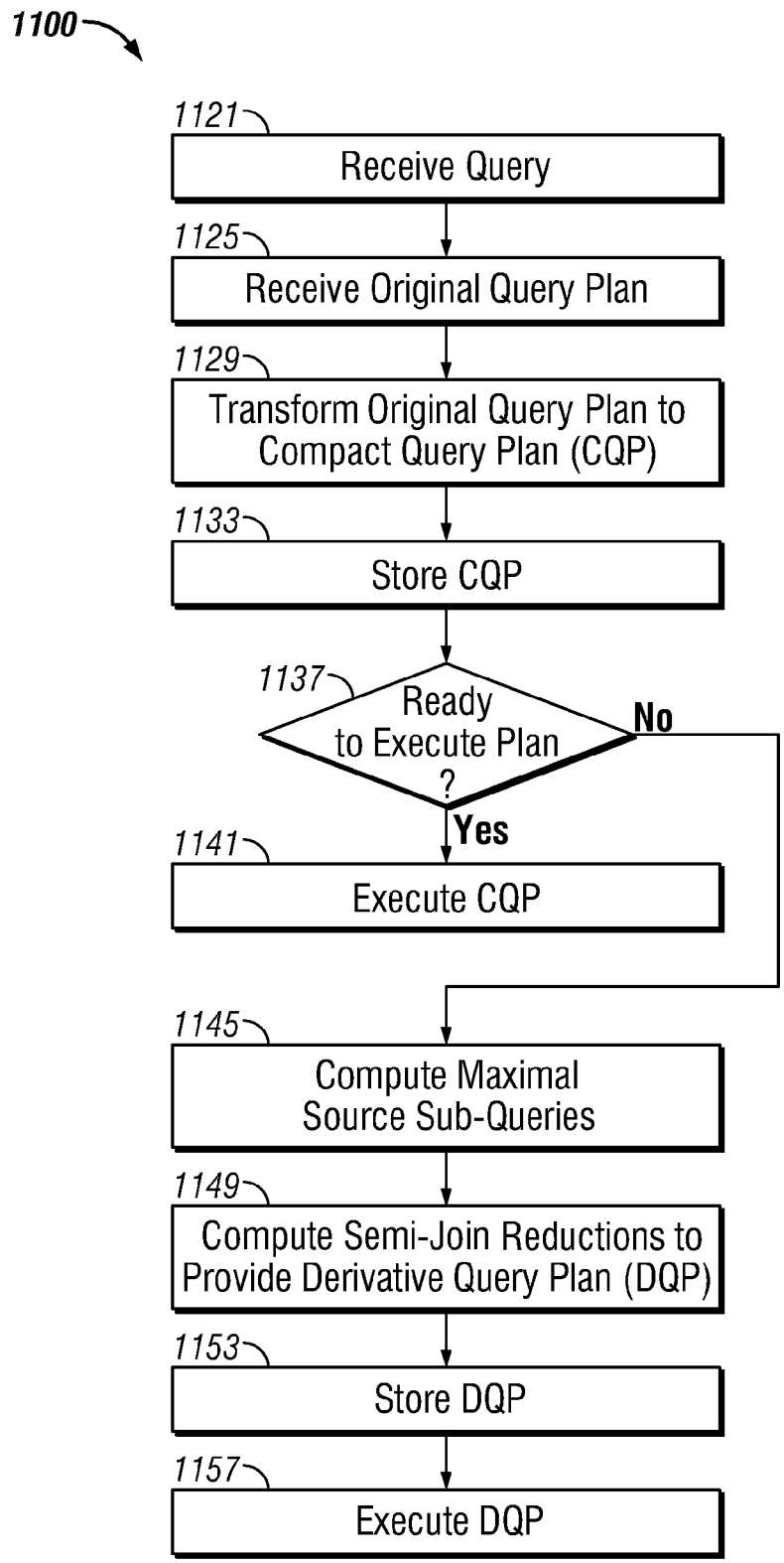
FIG. 11 is a flow diagram illustrating several computer-implemented methods according to various embodiments of the invention.

For example, FIG. 11 is a flow diagram illustrating several computer-implemented methods 1100 according to various embodiments of the invention. The methods 1100 are implemented in a machine-accessible and readable medium and are operational over processes within and among networks. The networks may be wired, wireless, or a combination of wired and wireless. The methods 1100 may be implemented as instructions, which when accessed by a specific machine, perform the processing depicted in FIG. 11. Given this context, the reformulation of queries associated with multiple database files, and other types of files, will now be discussed with reference to FIG. 11.

In various embodiments, a processor-implemented method 1100 that can be used to reformulate original query plans to provide a CQP, or a derivative of a CQP, may begin at block 1121. The activity at block 1121 may include receiving a query. The query may be received from a user operating a terminal, or from a processing node as an automated query. The query may be processed to provide an original query plan.

At this point, the various elements described previously may be implemented, including transforming an original query plan into a CQP. The CQP may be characterized by various properties, such as having two or more source nodes, having at least one abstract node, having at least one singleton node, where at least one of the abstract nodes has at least one of the source nodes or the singleton node as its child. In most embodiments, an abstract node consumes as many source nodes (tables) as needed to provide a single table output.

Thus, a processor-implemented method 1100 to execute on one or more processors that perform the method, may continue at block 1125 with receiving an original query plan comprising query nodes that include one or more database operations. The method 1100 may continue on to block 1129 with transforming the original query plan into an equivalent executable CQP.

In many embodiments, the CQP comprises at least two source nodes including scan operations to source tables. The source tables can serve as a wrapper to the original source data. The source nodes may be coupled to one or more abstract nodes and one or more singleton nodes. One or more of the abstract nodes may have a child comprising at least one of the source nodes or a singleton node (but not another abstract node).

The singleton nodes comprise a single operation selected from aggregate, union, order by, or null accepting FOJ. At least one of the abstract nodes comprise a set of operations selected from at least one of cartesian product, evaluation, filter, LOJ, or null rejecting FOJ. At least one of the abstract nodes is partitioned into multiple intra-partition commutable operations that can be executed in a different order from the original query plan based on upward compatibility. Thus, at least for one of the abstract nodes, as soon as there are more than two partitions, one of them must be a single null rejecting LOJ operation, or a combination of a single null rejecting LOJ operation and multiple intra-partition commutable operations.

The method 1100 may continue on to block 1133 with storing the CQP on a machine readable device, such as a memory in a processing node, a storage node, etc.

The database operations from the original query plan may be grouped into BE, FOJ, and LOJ sets. A BE set of operations may include Cartesian Product, Evaluation, Filter, and null-accepting LOJ operations. An FOJ set of operations may include FOJ and null-propagating Evaluation operations. An LOJ set contains a single null-rejecting LOJ operation. Thus, in some embodiments, the method 1100 may include, at block 1129, grouping the database operations in the original query plan within at least one abstract node into sets of operations, and determining a set of precedence links between the sets that define exactly all ordering dependencies between the sets.

Source nodes in the CQP can be constructed when data source scan operators are found in the original query plan. Thus, the activity at block 1129 may comprise traversing the query nodes in the original query plan, and forming one of the source nodes in the CQP when a data source scan operator is encountered in the original query plan.

Some of the source nodes may be reduced in size by finding reducible BVS vectors. Thus, the activity at block 1129 may include reducing some of the source nodes by determining existence of reducible vectors associated with input nodes of the source nodes.

Bind joins can be used to revise sources nodes and enhance the CQP processing speed. Thus, the activity at block 1129 may include revising one of the source nodes to include a bind join between a cache node and another node along a reduction path.

Singleton nodes in the CQP may be constructed when Aggregate Group by (A) operator, null-accepting Full Outer Join (FOJ) operator, Order by (O) operator, or Union (U) operators are found in the original query plan. Thus, the activity at block 1129 may further comprise traversing the query nodes in the original query plan, and forming additional singleton nodes in the compact query plan when an A operator, a null-accepting FOJ operator, an O operator, or a U operator is encountered in the original query plan.

Abstract nodes in the CQP may be constructed when Cartesian product (C), Filter (F), Evaluation (E), LOJ, or null-rejecting FOJrej operators are found in the original query plan. Thus, the activity at block 1129 may comprise traversing the query nodes of the original query plan, and forming additional abstract nodes in the compact query plan when a C operator, an F operator, an E operator, an LOJ operator, or an FOJrej operator is encountered in the original query plan.

If the CQP is of an acceptable size or complexity, and it is determined that the CQP should be executed directly at block 1137, then the method 1100 may continue on to block 1141 with executing the CQP. Otherwise, further processing may occur by passing on to block 1145, in which a derivative of the CQP is produced for execution.

The CQP may be further processed to find maximal source sub-queries. Thus, the method 1100 may continue on to block 1145 to include computing maximal source sub-queries associated with the CQP.

One or more abstract nodes can be processed to reduce the number of maximal source sub-queries. Thus, computing the maximal source sub-queries at block 1145 may further comprise searching for some of the maximal source sub-queries that can be extracted from the additional abstract nodes, and when a single one of the maximal source sub-queries that is equivalent to a first one of the additional abstract nodes is found, moving a tree rooted at the first one of the additional abstract nodes to a new source node. Otherwise, if an equivalent maximal source sub-query is not found, the activity at block 1145 may include creating new source nodes for multiple ones of the maximal source sub-queries, removing the new source nodes from a second one of the additional abstract nodes, and merging the new source nodes with the maximal source sub-queries associated with the source nodes corresponding to an input of the second one of the additional abstract nodes.

One or more singleton nodes can be processed to consolidate data source computations. Thus, computing the maximal source sub-queries at block 1145 may further comprise determining that all input nodes to the at least one singleton node in the CQP are associated with a single data source, and moving a tree rooted at the at least one singleton node to a source node associated with the single data source to increase a profit function.

The maximal source sub-queries may be further processed to provide a derivative query plan. Thus, the method 1100 may continue on to block 1149 to include computing semi-join reductions of maximal source sub-queries associated with the CQP to provide a derivative query plan.

For computing semi-join reductions, it may be useful to know the output variables of the CQP that can be reduced via equality filtering conditions. Thus, the activity at block 1149 may comprise determining a reducer set of variables for each output variable of the CP that can be transitively reduced by each one of the reducer set of variables.

Once the semi-join reductions are determined (e.g., using the reducer set of variables), the semi-join reductions can be integrated into the appropriate abstract nodes. Thus, the activity at block 1149 may further comprise integrating the semi-join reductions into one or more abstract nodes.

Thus, in summary, some embodiments of the method 1100 include computing maximal source sub-queries associated with the CQP at block 1145, and computing semi-join reductions of the maximal source sub-queries to provide an executable derivative query plan (DQP) at block 1149.

In some embodiments, the method 1100 includes storing the DQP on a machine readable device at block 1153. The method 1100 may continue on to include executing the DQP at block 1157.

The methods 1100 described herein do not have to be executed in the order described, or in any particular order. Moreover, various activities described with respect to the methods identified herein can be executed in repetitive, serial, or parallel fashion. The individual activities of the methods shown in FIG. 11 can also be combined with each other and/or substituted, one for another, in various ways. Information, including parameters, commands, operands, and other data, can be sent and received in the form of one or more carrier waves. Thus, many other embodiments may be realized.

The various operations of example methods described herein may be performed, at least partially, by one or more processors that are temporarily configured (e.g., by software) or permanently configured (e.g., via hardware) to perform the relevant operations. Whether temporarily or permanently configured, such processors may constitute processor-implemented modules, logic or managers, that operate to perform one or more operations or functions. The modules, logic, and managers referred to herein may, in some example embodiments, comprise processor-implemented modules, logic, or managers.

Similarly, the methods 1100 described herein may be at least partially processor-implemented. For example, at least some of the operations of any one method may be performed by one or more processors or processor-implemented modules. The performance of certain operations may be distributed among the one or more processors, not only residing within a single machine, but deployed across a number of machines. In some embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs)). Many embodiments may thus be realized.

Figure 12:
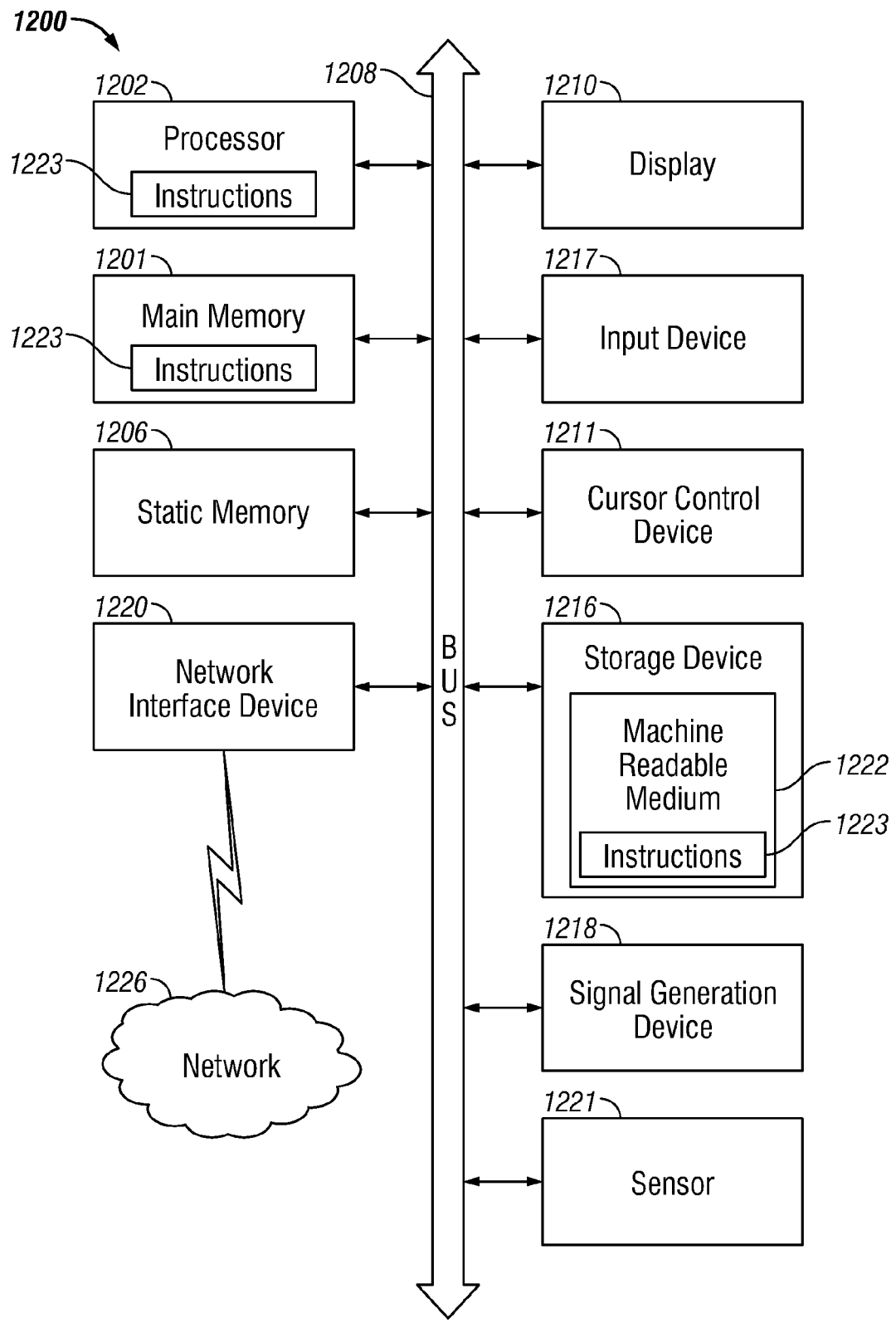
FIG. 12 is a block diagram of an article of manufacture, in the form of a specific machine, according to various embodiments of the invention.

For example, FIG. 12 is a block diagram of an article of manufacture, including a specific machine, according to various embodiments of the invention.

Upon reading and comprehending the content of this disclosure, one of ordinary skill in the art will understand the manner in which a software program can be launched from a computer-readable medium in a computer-based system to execute the functions defined in the software program.

One of ordinary skill in the art will further understand that various programming languages may be employed to create one or more software programs designed to implement and perform the methods and algorithms disclosed herein. The programs may be structured in an object-orientated format using an object-oriented language such as Java or C++. Alternatively, the programs can be structured in a procedure-orientated format using a procedural language, such as assembly or C. The software components may communicate using any of a number of mechanisms well known to those of ordinary skill in the art, such as application program interfaces or interprocess communication techniques, including remote procedure calls. The teachings of various embodiments are not limited to any particular programming language or environment. Thus, other embodiments may be realized.

For example, an article of manufacture, such as a computer, a memory system, a magnetic or optical disk, some other storage device, and/or any type of electronic device or system may include one or more processors 1202 coupled to a machine-readable medium 1222 such as a memory (e.g., removable storage media, as well as any memory including an electrical, optical, or electromagnetic conductor) having instructions 1223 stored thereon (e.g., computer program instructions), which when executed by the one or more processors 1202 result in the machine performing any of the actions described with respect to the methods above. In some embodiments, the article of manufacture comprises a tangible medium 1222, such as a CD-ROM or other non-volatile memory, to store the instructions 1223.

In some embodiments, a computer system 1200 may operate as a specific machine that includes a processor 1202 (e.g., a central processing unit (CPU), a graphics processing unit (GPU) or both), a main memory 1201 and a static memory 1206, which communicate with each other via a bus 1208. The computer system 1200 may further include a display unit 1210, an alphanumeric input device 1217 (e.g., a keyboard), and a user interface (UI) navigation device 1211 (e.g., a mouse). In one embodiment, the display, input device and cursor control device form part of a touch screen display. The computer system 1200 may additionally include a storage device (e.g., drive unit 1216), a signal generation device 1218 (e.g., a speaker), a network interface device 1220, and one or more sensors 1221, such as a global positioning system sensor, compass, accelerometer, or other sensor.

The computer system 1200 may comprise a specific machine within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a client-server network environment, or as a peer machine in peer-to-peer (or distributed) network environment. In some embodiments, the machine comprises any one of a server, a personal computer (PC), a tablet PC, a set-top box (STB), a PDA, a mobile telephone, a web appliance, a network router, a switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The system 1200 may be similar to or identical to the apparatus 1000 or system 1010 of FIG. 10.

Returning to FIG. 12, it can be seen that the drive unit 1216 includes a machine-readable medium 1222 on which is stored one or more sets of instructions and data structures (e.g., instructions 1223) embodying or utilized by any one or more of the methodologies or functions described herein. The instructions 1223 may also reside, completely or at least partially, within the main memory 1201 and/or within the processor 1202 during execution thereof by the computer system 1200, the main memory 1201 and the processor 1202 also constituting machine-readable media.

While the machine-readable medium 1222 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The instructions 1223 may further be transmitted or received over a communications network 1226 using a transmission medium via the network interface device 1220 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

In conclusion, it can be seen that mega queries over data sources may sometimes occur due to the complexity of source to target mappings, thereby raising a significant challenge to EII query optimizers. In many embodiments, mega queries that make up an original query plan may be substantially reduced in terms of system operational cost by producing a CQP. In some embodiments, optimization techniques for finding maximal source sub-queries and reducing the result set of source queries through Bind Join operations may be implemented. These latter techniques can be run respectively in linear and polynomial time over the CQP while consuming relatively little memory. The CQP, and derivatives of the CQP provided by the application of these techniques can be effective with respect to reducing the size of the data processing set of an original query, perhaps enabling scalable optimization of mega queries.

Implementing the apparatus, systems, and methods described herein may operate to render the processing of large data files more efficiently, providing higher performance and a simplified desktop experience. More efficient allocation of processing resources, and increased user satisfaction, may also result.

This Detailed Description is illustrative, and not restrictive. Many other embodiments will be apparent to those of ordinary skill in the art upon reviewing this disclosure. The scope of embodiments should therefore be determined with reference to the appended claims, along with the full scope of equivalents to which such claims are entitled.

The Abstract of the Disclosure is provided to comply with 37 C.F.R. §1.72(b) and will allow the reader to quickly ascertain the nature of the technical disclosure. It is submitted with the understanding that it will not be used to interpret or limit the scope or meaning of the claims.

In this Detailed Description of various embodiments, a number of features are grouped together in a single embodiment for the purpose of streamlining the disclosure. This method of disclosure is not to be interpreted as an implication that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus, comprising:
a hardware processing node comprising a data reception module to receive an original query plan comprising query nodes that include one or more database operations; and
an analysis module to couple to the processing node,
the analysis module to transform the original query plan into an equivalent executable compact query plan to store on a machine readable device,
the compact query plan comprising at least two source nodes including scan operations to source tables, the at least two source nodes coupled to at least one abstract node and at least one singleton node,
wherein a child of the at least one abstract node comprises at least one of the source nodes or the at least one singleton node, but not another abstract node,
wherein the at least one singleton node comprises a single operation selected from aggregate, union, order by, or null accepting full outer join,
wherein the at least one abstract node comprises a set of operations selected from at least one of Cartesian product, evaluation, filter, left outer join, or null rejecting full outer join, and
wherein the at least one abstract node is partitioned into multiple intra-partition commutable operations that can be executed in a different order from the original query plan based on upward compatibility or a combination of a single null rejecting left outer join operation and the multiple intra-partition commutable operations.

2. The apparatus of claim 1, further comprising:
a display to display a search result provided by executing the compact query plan or a derivative query plan derived from the compact query plan.

3. The apparatus of claim 1, further comprising:
multiple processors, wherein the processing node comprises a first one of the multiple processors, and wherein the analysis module comprises a software module to be executed by a second one of the multiple processors.

4. The apparatus of claim 1, wherein the processing node comprises one of a server or a client.

5. A system, comprising:
a hardware storage node to store at least one of a plurality of databases;
a first processing node comprising a data reception module to receive at least a portion of an original query plan comprising query nodes that include one or more database operations to be conducted on the plurality of databases; and
a second processing node comprising an analysis module to couple to the first processing node,
the analysis module to transform the original query plan into an equivalent executable compact query plan to store on a machine readable device,
the compact query plan comprising at least two source nodes including scan operations to source tables,
the at least two source nodes coupled to at least one abstract node and at least one singleton node,
wherein a child of the at least one abstract node comprises at least one of the source nodes or the at least one singleton node, but not another abstract node,
wherein the at least one singleton node comprises a single operation selected from aggregate, union, order by, or null accepting full outer join,
wherein the at least one abstract node comprises a set of operations selected from at least one of Cartesian product, evaluation, filter, left outer join, or null rejecting full outer join, and
wherein the at least one abstract node is partitioned into multiple intra-partition commutable operations that can be executed in a different order from the original query plan based on upward compatibility or a combination of a single null rejecting left outer join operation and the multiple intra-partition commutable operations.

6. The system of claim 5, wherein the plurality of databases are stored on a plurality of storage nodes, including the storage node.

7. The system of claim 5, further comprising:
a display coupled to a third processing node to display at least a portion of a database query that is processed to provide the original query plan.

8. A processor-implemented method to execute on one or more processors that perform the method, comprising:
receiving an original query plan comprising query nodes that include one or more database operations;
transforming the original query plan into an equivalent executable compact query plan comprising at least two source nodes including scan operations to source tables, the at least two source nodes coupled to at least one abstract node and at least one singleton node, wherein a child of the at least one abstract node comprises at least one of the source nodes or the at least one singleton node, but not another abstract node, wherein the at least one singleton node comprises a single operation selected from aggregate, union, order by, or null accepting full outer join, wherein the at least one abstract node comprises a set of operations selected from at least one of Cartesian product, evaluation, filter, left outer join, or null rejecting full outer join, and wherein the at least one abstract node is partitioned into multiple intra-partition commutable operations that can be executed in a different order from the original query plan based on upward compatibility or a combination of a single null rejecting left outer join operation and the multiple intra-partition commutable operations; and
storing the compact query plan on a machine readable device.

9. The method of claim 8, further comprising:
grouping the database operations within the at least one abstract node into sets of operations; and
determining a set of precedence links between the sets that define exactly all ordering dependencies between the sets.

10. The method of claim 8, further comprising:
traversing the query nodes in the original query plan; and
forming one of the source nodes in the compact query plan when a data source scan operator is encountered in the original query plan.

11. The method of claim 8, wherein the transforming further comprises:
traversing the query nodes in the original query plan; and
forming additional singleton nodes in the compact query plan when an Aggregate Group by (A) operator, null-accepting Full Outer Join (FOJ) operator, Order by (O) operator, or Union (U) operator is encountered in the original query plan.

12. The method of claim 8, further comprising:
traversing the query nodes of the original query plan; and
forming additional abstract nodes in the compact query plan when a Cartesian product (C) operator, Filter (F) operator, Evaluation (E) operator, a Left Outer Join (LOJ) operator, or null-rejecting Full Outer Join (FOJ$_{rej}$) operator is encountered in the original query plan.

13. The method of claim 12, further comprising:
computing maximal source sub-queries associated with the compact query plan.

14. The method of claim 13, wherein computing the maximal source sub-queries further comprises:
searching for some of the maximal source sub-queries that can be extracted from the additional abstract nodes; and
when a single one of the maximal source sub-queries that is equivalent to a first one of the additional abstract nodes is found, moving a tree rooted at the first one of the additional abstract nodes to a new source node,
otherwise, if an equivalent maximal source sub-query is not found, creating new source nodes for multiple ones of the maximal source sub-queries, removing the new source nodes from a second one of the additional abstract nodes, and merging the new source nodes with the maximal source sub-queries associated with the source nodes corresponding to an input of the second one of the additional abstract nodes.

15. The method of claim 12, wherein computing the maximal source sub-queries further comprises:
determining that all input nodes to the at least one singleton node in the compact query plan are associated with a single data source; and
moving a tree rooted at the at least one singleton node to a source node associated with the single data source to increase a profit function.

16. The method of claim 8, further comprising:
computing semi-join reductions of maximal source sub-queries associated with the compact query plan to provide a derivative query plan.

17. The method of claim 16, wherein computing the semi-join reductions further comprises:
determining a reducer set of variables for each output variable of the compact query plan that can be transitively reduced by each one of the reducer set of variables.

18. The method of claim 16, wherein computing the semi-join reductions further comprises:
integrating the semi-join reductions into the at least one abstract node.

19. An article comprising a tangible computer-readable storage medium containing executable instructions stored thereon which, when executed, result in a processor performing:
transforming an original query plan into an equivalent executable compact query plan comprising at least two source nodes including scan operations to source tables, the at least two source nodes coupled to at least one abstract node and at least one singleton node, wherein a child of the at least one abstract node comprises at least one of the source nodes or the at least one singleton node, but not another abstract node, wherein the at least one singleton node comprises a single operation selected from aggregate, union, order by, or null accepting full outer join, wherein the at least one abstract node comprises a set of operations selected from at least one of Cartesian product, evaluation, filter, left outer join, or null rejecting full outer join, and wherein the at least one abstract node is partitioned into multiple intra-partition commutable operations that can be executed in a different order from the original query plan based on upward compatibility or a combination of a single null rejecting left outer join operation and the multiple intra-partition commutable operations;
computing maximal source sub-queries associated with the compact query plan;
computing semi-join reductions of the maximal source sub-queries to provide an executable derivative query plan; and
storing the derivative query plan on a machine readable device.

20. The article of claim 19, containing executable instructions stored thereon which, when executed, result in the processor performing:

reducing some of the source nodes by determining existence of reducible vectors associated with input nodes of the source nodes.

21. The article of claim 19, containing executable instructions stored thereon which, when executed, result in the processor performing:

revising one of the source nodes to include a bind join between a cache node and another node along a reduction path.

22. A processor-implemented method to execute on one or more processors that perform the method, comprising:

receiving an original query plan comprising query nodes that include one or more database operations;

transforming the original query plan into an equivalent executable compact query plan comprising at least two source nodes including scan operations to source tables, the at least two source nodes coupled to at least one abstract node and at least one singleton node, wherein a child of the at least one abstract node comprises at least one of the source nodes, but not another abstract node, wherein the at least one singleton node comprises an aggregate operation, wherein the at least one abstract node comprises a set of operations including left outer join, and wherein the at least one abstract node is partitioned into multiple intra-partition commutable operations that can be executed in a different order from the original query plan based on upward compatibility; and storing the compact query plan on a machine readable device.

23. A processor-implemented method to execute on one or more processors that perform the method, comprising:

receiving an original query plan comprising query nodes that include one or more database operations;

transforming the original query plan into an equivalent executable compact query plan comprising at least two source nodes including scan operations to source tables, the at least two source nodes coupled to at least one abstract node and at least one singleton node, wherein a child of the at least one abstract node comprises the at least one singleton node, but not another abstract node, wherein the at least one singleton node comprises a union operation, wherein the at least one abstract node comprises a set of operations including an evaluation operation, and wherein the at least one abstract node is partitioned into multiple intra-partition commutable operations that can be executed in a different order from the original query plan based on a combination of a single null rejecting left outer join operation and the multiple intra-partition commutable operations; and storing the compact query plan on a machine readable device.

* * * * *